United States Patent
Drake et al.

(10) Patent No.: US 11,556,240 B2
(45) Date of Patent: Jan. 17, 2023

(54) GESTURE RECOGNITION ON WATCH BEZEL USING STRAIN GAUGES

(71) Applicant: Google LLC, Mountain View, CA (US)

(72) Inventors: Kevin Drake, Campbell, CA (US); Matthew Wimmer, San Diego, CA (US); Debanjan Mukherjee, San Jose, CA (US); Jeffrey Wheeler, Redwood City, CA (US); Deborah Kathleen Vitus, San Mateo, CA (US); Haechang Lee, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/819,738

(22) Filed: Mar. 16, 2020

(65) Prior Publication Data

US 2020/0319768 A1 Oct. 8, 2020

Related U.S. Application Data

(60) Provisional application No. 62/828,123, filed on Apr. 2, 2019.

(51) Int. Cl.

| G06F 3/01 | (2006.01) |
|---|---|
| G06F 3/0488 | (2022.01) |
| G04G 9/00 | (2006.01) |
| G04G 21/08 | (2010.01) |

(52) U.S. Cl.
CPC ........... G06F 3/0488 (2013.01); G04G 9/007 (2013.01); G04G 21/08 (2013.01)

(58) Field of Classification Search
None
See application file for complete search history.

(56) References Cited

U.S. PATENT DOCUMENTS

| 9,477,313 | B2 | 10/2016 | Mistry et al. | |
|---|---|---|---|---|
| 9,612,170 | B2 | 4/2017 | Vosgueritchian et al. | |
| 9,939,784 | B1 * | 4/2018 | Berardinelli | H04M 1/72412 |
| 2009/0059730 | A1 * | 3/2009 | Lyons | G04G 21/04 |
| | | | | 368/69 |
| 2011/0242029 | A1 * | 10/2011 | Kasahara | G06F 3/04886 |
| | | | | 345/173 |
| 2014/0019917 | A1 * | 1/2014 | Piemonte | G06F 3/0485 |
| | | | | 715/848 |
| 2014/0049522 | A1 * | 2/2014 | Mathew | H01L 51/5281 |
| | | | | 345/204 |
| 2014/0059478 | A1 | 2/2014 | Dearman et al. | |
| 2015/0296622 | A1 * | 10/2015 | Jiang | G06F 1/1626 |
| | | | | 361/750 |
| 2017/0052622 | A1 * | 2/2017 | Smith | G06F 3/0416 |
| 2018/0188715 | A1 * | 7/2018 | Celia | G06F 3/0488 |

* cited by examiner

Primary Examiner — Brian M Butcher
(74) Attorney, Agent, or Firm — Lerner, David, Littenberg, Krumholz & Mentlik, LLP

(57) ABSTRACT

The technology provides for an electronic device with gesture detection. In this regard, the device may include a housing, and one or more sensors positioned along an inner periphery of the housing. The sensors may be adapted to detect user interaction with an outer surface of the housing. The device may further include one or more processors in communication with the plurality of sensors. The one or more processors may be configured to determine the user interaction and to determine a type of gesture based on the detected user interaction, determine a type of input command based on the determined gesture, and execute a task corresponding to the determined type of input command.

22 Claims, 20 Drawing Sheets

GESTURE RECOGNITION ON WATCH BEZEL USING STRAIN GAUGES

CROSS-REFERENCE TO RELATED APPLICATIONS

The present application claims the benefit of the filing date of U.S. Provisional Patent Application No. 62/828,123 filed Apr. 2, 2019, the disclosure of which is hereby incorporated herein by reference.

BACKGROUND

Small form factor electronic devices, such as mobile phones, wearable electronic devices, etc. typically have one or more types of input. Examples of such conventional inputs include capacitive touch screens, push buttons, rotating scrolling buttons (e.g., a crown of a smartwatch), and capacitive touch edges.

Capacitive touch screens are good for many of the interactions with the electronic device. However the small size of some devices, such as smartwatches, requires a small screen. Content on such a small screen is easily obscured when touching the device, making it difficult to precisely select and scroll because the user cannot see what they are selecting or scrolling.

Rotating scrolling buttons are used to scroll on many smartwatches today, and are reasonably efficient. However, they require a fairly complicated mechanical structure with very small moving parts. They further require waterproofing. Some users may prefer to remove the crown, such as for aesthetic reasons.

BRIEF SUMMARY

The present disclosure enables input to an electronic device by interacting with a portion of the housing, such as an outer edge. For example, a user may press, swipe, tap, squeeze, or otherwise interact with a surface of the housing to trigger a particular response from the electronic device, such as displaying a particular output, changing a mode, adjusting a volume, turning on a light, reading a text, updating a setting (e.g., a clock, alarm, etc.) or any other type of function.

One aspect of the disclosure provides an electronic device, including a housing, one or more sensors positioned along an inner periphery of the housing, and one or more processors in communication with the one or more sensors. The one or more processors may be configured to determine, using information detected by the one or more sensors, a user interaction with an outer surface of the housing, determine a type of gesture based on the detected user interaction, determine a type of input command based on the determined gesture, and execute a task corresponding to the determined type of input command.

According to some examples, the one or more sensors include strain gauge sensors. For example, they may be strain elements arranged in a Wheatstone bridge configuration. The one or more sensors may be a plurality of sensors spaced along the inner periphery of the housing. The inner periphery of the housing may be angled with respect to an outer periphery of the housing.

Another aspect of the disclosure provides a method of detecting input to an electronic device. The method includes receiving, by one or more processors from one or more sensors, sensor data related to an interaction with a housing of the electronic device, determining, by the one or more processors based on the sensor data, a type of gesture, determining, by the one or more processors based on the type of gesture, a type of user command, and executing, by the one or more processors based on the type of input command, an action corresponding to the user command.

According to some examples, the method may further include determining, by the one or more processors based on the sensor data, one or more positions on the housing where the force is applied, wherein determining the type of gesture is further based on the positions on the housing where the force is applied. In some examples, the method may further include determining, by the one or more processors based on the sensor data, a direction in which the force is applied, wherein determining the type of gesture is further based on the direction in which the force is applied. In some examples, the method may further include determining, by the one or more processors based on the sensor data, a velocity of the force applied, wherein determining the type of gesture is further based on the velocity of the force is applied. In some examples, the method may further include determining, by the one or more processors based on the sensor data, a duration of the force applied, wherein determining the type of gesture is further based on the duration of the force is applied. In some examples, the method may further include determining, by the one or more processors based on the sensor data, that the force is applied successively within a predetermined time period, wherein determining the type of gesture is further based on whether the force is applied successively within a predetermined time period.

The method may further include fusing, by the one or more processors, sensor data received from at least two of the sensors into a combined stream of sensor data at a series of time points, the combined stream of sensor data including at least two data points at each time point. Moreover, it may include correlating, by the one or more processors, the fused sensor data with models for at least two sensors, and estimating, by the one or more processors based on the correlation, properties of the gesture including one or more positions where the applied force is detected. The properties y further include a magnitude of the applied force detected at the one or more positions.

The method may further include setting, by the one or more processors, a first sampling rate for the sensors, and applying, by the one or more processors, a filter on sensor data received from the sensors for detecting whether a force meeting a threshold value. The method may further include determining, by the one or more processors, that the filtered sensor data indicates a force meeting the threshold value, determining, by the one or more processors based on the force meeting the threshold value, a detection of a gesture of a user, and setting, by the one or more processors, a second sampling rate for the sensors, the second sampling rate being higher than the first sampling rate.

Yet another aspect of the disclosure provides a method of determining gesture input for an electronic device. This method includes receiving, from one or more sensors, sensor data related to an interaction with a housing of the electronic device, the sensor data including a plurality of data points, comparing, with one or more processors, the plurality of data points to a model of sensor responses, deriving, with the one or more processors based on the comparison, a parameter in which the data points align with the model, and determining, with the one or more processors based on the derived parameter, a gesture. Each data point may correspond to information from an independent sensor. The model may include a plurality of curves, each curve corresponding to one of the independent sensors. The parameter may include at least one of a position, a level of applied force, or a velocity.

DETAILED DESCRIPTION

The present disclosure enables input to an electronic device by interacting with a portion of the housing, such as an outer edge. For example, a user may press, swipe, tap, squeeze, or otherwise interact with a surface of the housing. Such interactions are detected, such as by one or more sensors within the housing that are coupled to one or more processors. The type of interaction, or gesture, is determined, and a command or action or request corresponding to the type of interaction is also determined. Accordingly, the device may react by performing a function responsive to the input command, such as displaying a particular output, changing a mode, adjusting a volume, turning on a light, reading a text, updating a setting (e.g., a clock, alarm, etc.) or any other type of function.

The systems and methods are beneficial in that they enable precise input to electronic devices, in particular small form factor electronic devices. Sensors in the system may be configured to detect subtle differences in gestures, such as directions, positions, force, velocity, timing, etc. Further, by setting low power modes which uses low power processors and low sampling rates, the device may be configured to save energy. As such, user experience is improved because users will more easily be able to enter input, with fewer mistakes. Still further, sensor in the system may provide flexibility in product design, such as material choices that may provide better aesthetic, mechanical, and other properties.

FIGS. 1A-1I are pictorial diagrams illustrating example gestures and example user inputs for an electronic device. While in these examples the electronic device is a smart watch, it should be understood that the input gestures may be applied to any of a variety of types of electronic devices. For example, the electronic devices may be mobile phones, smart watches, earbuds, augmented reality or virtual reality headsets, smart glasses, smart motorcycle helmets, etc.

Figure 1A:
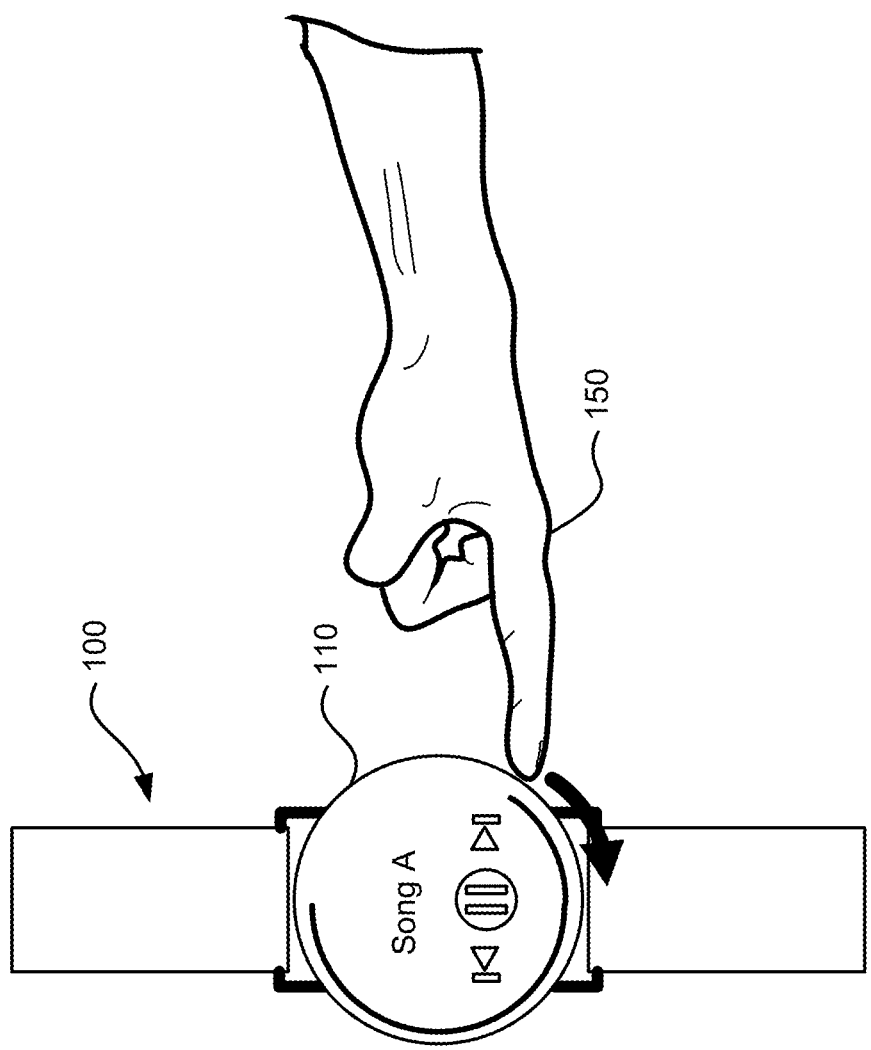
FIGS. 1A-1I are pictorial diagrams illustrating example gestures and example user inputs in accordance with aspects of the disclosure.

Referring to FIG. 1A, an electronic device 100 is shown. The housing 110 may be made of any of a number of materials, such as metal, plastic, ceramic, wood, etc. In some instances, the housing 110 may be made of a non-permeable material (e.g. water-proof) so that components inside the housing 110 may be protected from environmental damage.

The device may be configured to perform any of a number of functions, such as generating output to a user, such as information and graphics on a display, audio by a speaker, etc. For example as shown, the device 100 may play a song on a speaker and generate a display of information about the song. The device 100 may also receive user inputs, such as by buttons, keyboard, touchscreen, microphone, sensors, etc. In particular, the device 100 may be provided with capabilities to detect user gestures, such as a gesture by a hand 150 of a user. For instance, the device 100 may be configured to detect one or more gestures that applies a force on a housing 110 of the device 100. Based on a detection of the user input, the device 100 may determine a user command. For example, based on a gesture of the hand 150, the device 100 may determine that the user command is to pause the song, fast forward to a song, or rewind to a previous song, etc.

Figure 1D:
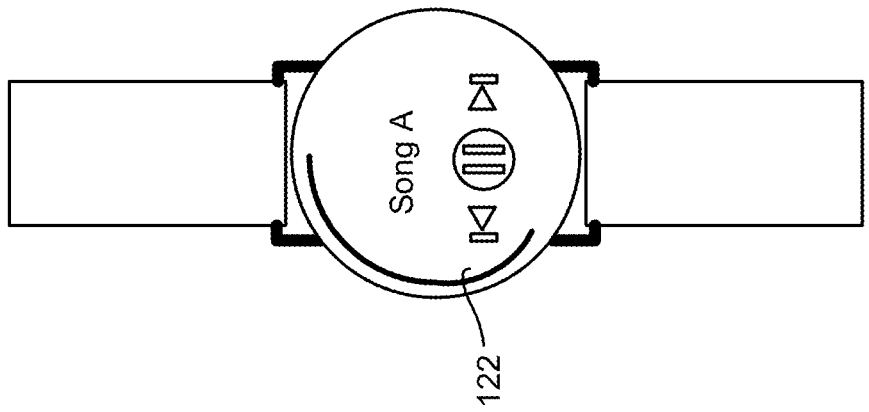
Figure 1C:
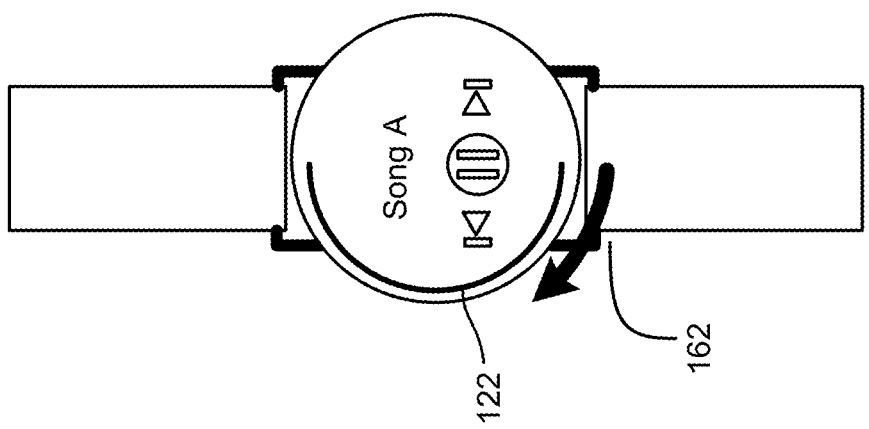
Figure 1B:
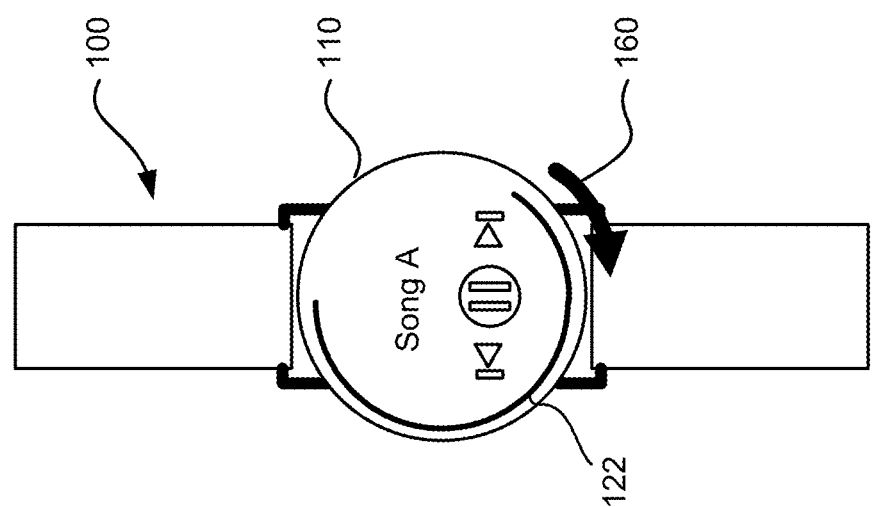

FIGS. 1B-1D illustrate an example sliding gesture, where a user slides a finger from a first portion of the housing to a second portion. In this particular example, the sliding gesture causes a volume level of a song being played to decrease. For example, volume level 122 is shown at a first level in FIG. 1B. As the user slides its finger along the housing 110, the volume level is decreased, as shown in FIG. 1C. As the user continues to slide, the volume decreases further, as shown in FIG. 1D. Sliding the user's finger in an opposite direction may conversely cause the electronic device 100 to increase volume. Other types of gestures may cause different responses from the electronic device, such as fast forward the song being played, or skip to a next song, rewind the song being played, or skip to a previous song.

In different modes, the sliding gesture may correspond to different input commands, thereby triggering different actions. For example, the sliding gesture may trigger any of a variety of actions, such as adjusting a brightness level of a display, adjusting a time setting, scrolling through content, etc.

Figure 1G:
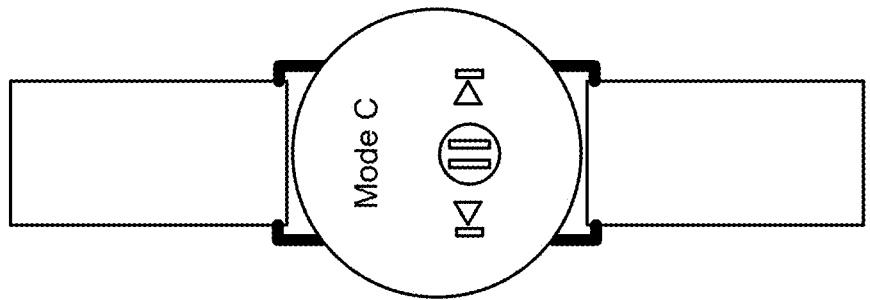
Figure 1F:
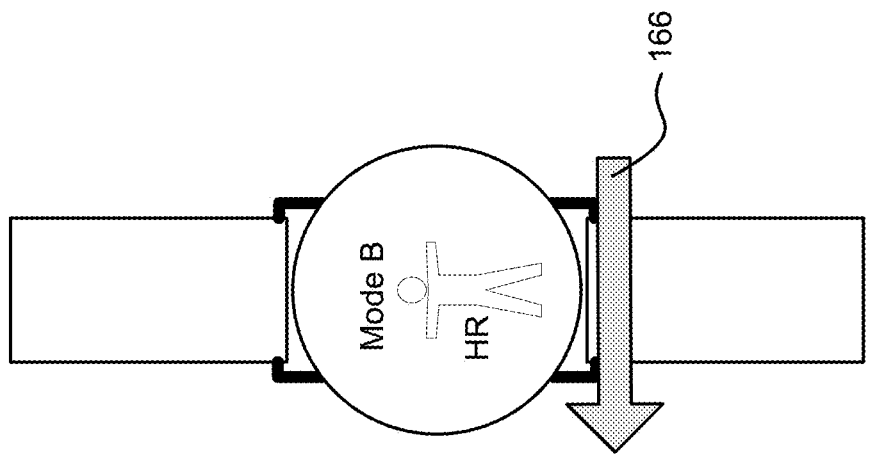
Figure 1E:
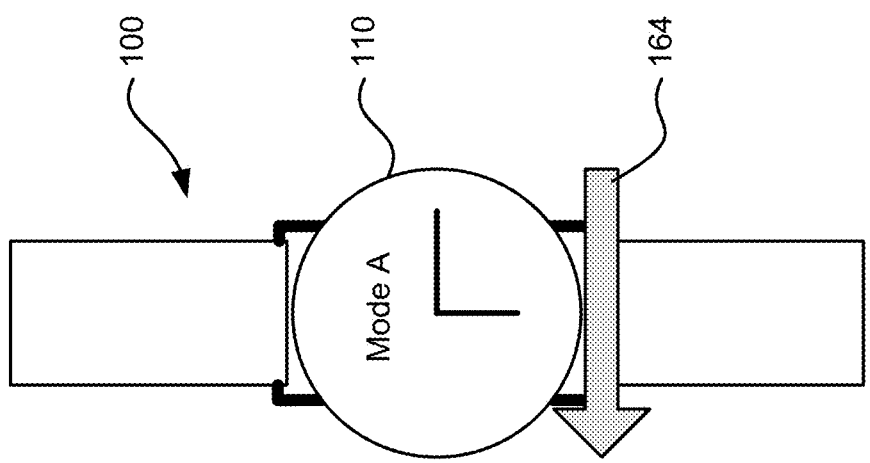

It should further be understood that any of a number of different gestures are also possible. For example, FIGS. 1E-1G illustrate an example swiping gesture. In this example, the swiping gesture is used to change modes of the electronic device. In FIG. 1E, the electronic device is in a first mode, Mode A. For example as shown, the first mode of operation may be to display time. A first swipe gesture 164 of a user's finger brushing against a surface of the housing 110 causes the electronic device to switch to a second mode, Mode B, in FIG. 1F. For example as shown, the second mode of operation may be displaying a heart rate of the user. A similar swiping gesture 166 further causes the electronic device to switch to a third mode, Mode C, in FIG. 1G. For example as shown, the third mode of operation may be to play an audio file, such as a song. Swiping in the opposite direction may conversely return to a previous mode. Swipes in different directions or along different portions of the housing 110 may trigger different responses. For example, upwards or downwards swipes along a side edge of the housing 110 may perform different functions, such as scrolling, etc.

Figure 1I:
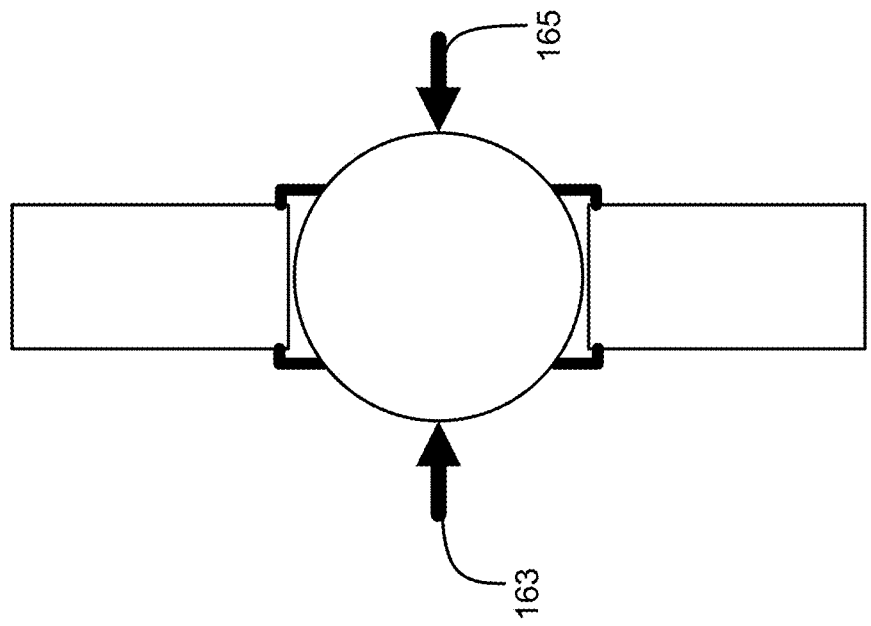
Figure 1H:
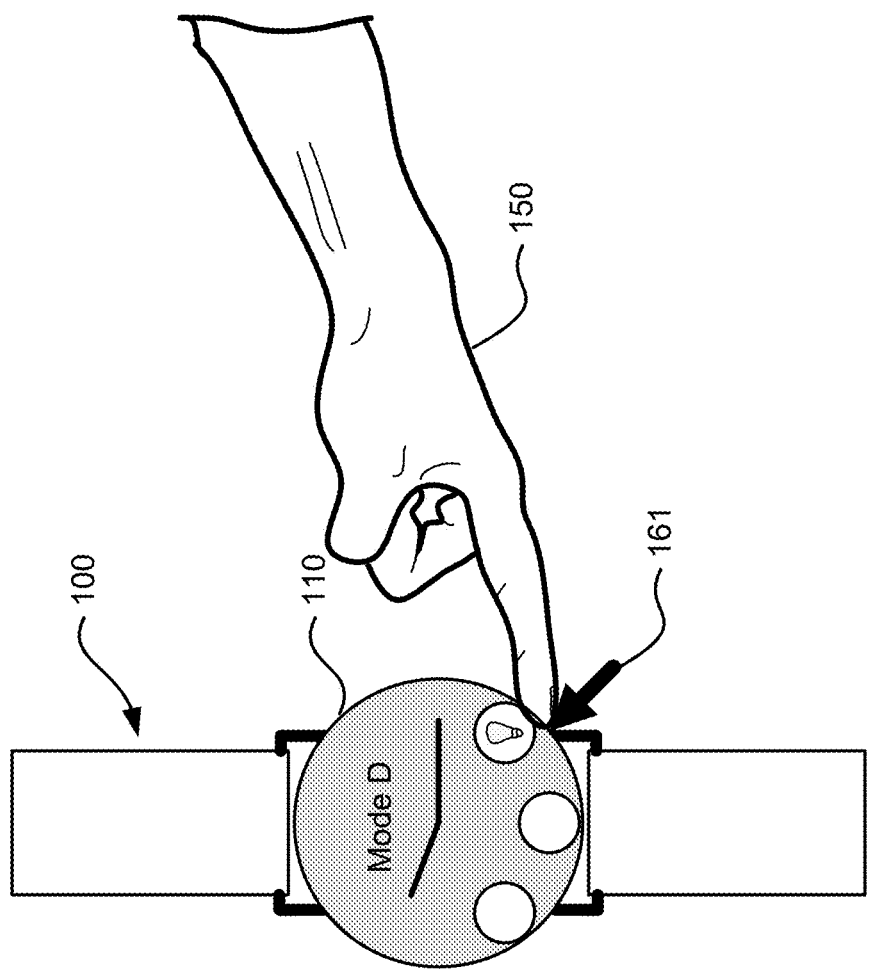

FIG. 1H shows another gesture example. For instance, based on detecting a tap 161 on the housing 110, device 100 may determine that the user is selecting, activating, or otherwise interacting with a function displayed at a portion of the screen where the user tapped. For example as shown, the function displayed at the tapped portion is a light, which can be turned on or off by the tap 161.

FIG. 1I illustrates an example squeezing gesture, which may consist of pressing 163, 165 the housing 110 at two locations at or around the same time. Such gesture may cause a song being played to pause, initiation of an action such as reading a text message, deactivation of a function such as turning off the display, or any of a variety of other actions.

Although FIGS. 1A-I illustrate various example gestures, device 100 may be configured to detect any of a number of other types of gestures. As some additional examples, other gestures may include upwards swipe, short or long swipe, fast or slow swipe, horizontal or vertical swipe, swipe of different edges of the housing, long taps or short taps, multiple taps within a threshold amount of time (e.g., double tap), hard squeeze or soft squeeze, squeeze at different locations, etc. Further, although FIGS. 1A-I illustrate several example commands based on the gesture of the user, any of a number of other commands may be based on the gesture of the user. As some additional examples, other commands may include changing a volume of audio, selecting an item or menu being displayed at the location of the touch, etc. Although FIGS. 1A-I illustrate a wearable device (a watch), in other examples (such as shown in other FIGURES of the disclosure), device 100 may alternatively be any of a number of devices, including other types of wearable devices (e.g., earbuds, glasses, helmet, ring), mobile devices (e.g., phone, tablet), personal computing devices (e.g., laptop, desktop), or any other device (e.g., appliances, robots).

Figure 2A:
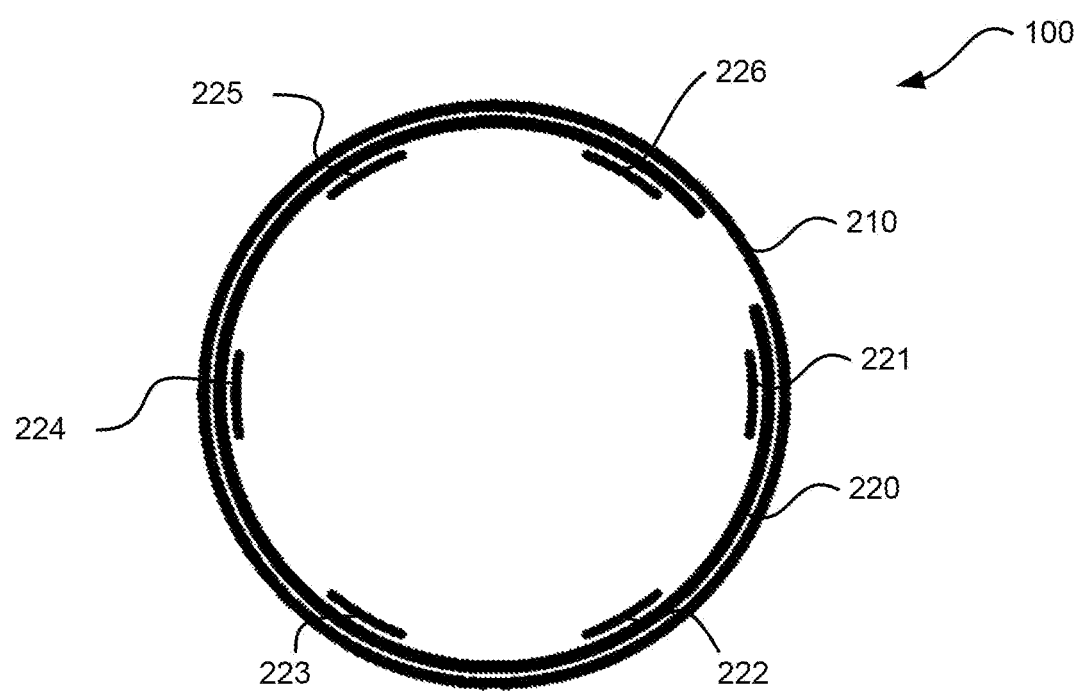
FIG. 2A-2C are pictorial diagrams illustrating example sensor arrangements in various types of electronic devices in accordance with aspects of the disclosure.
Figure 2B:
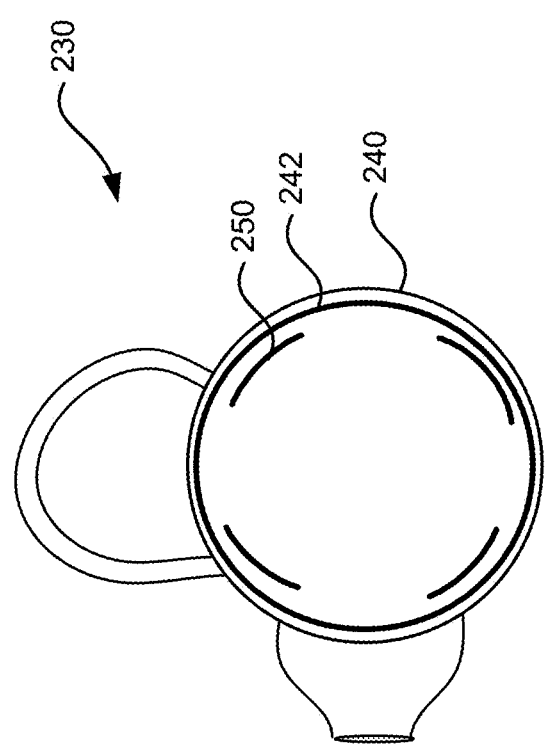
Figure 2C:
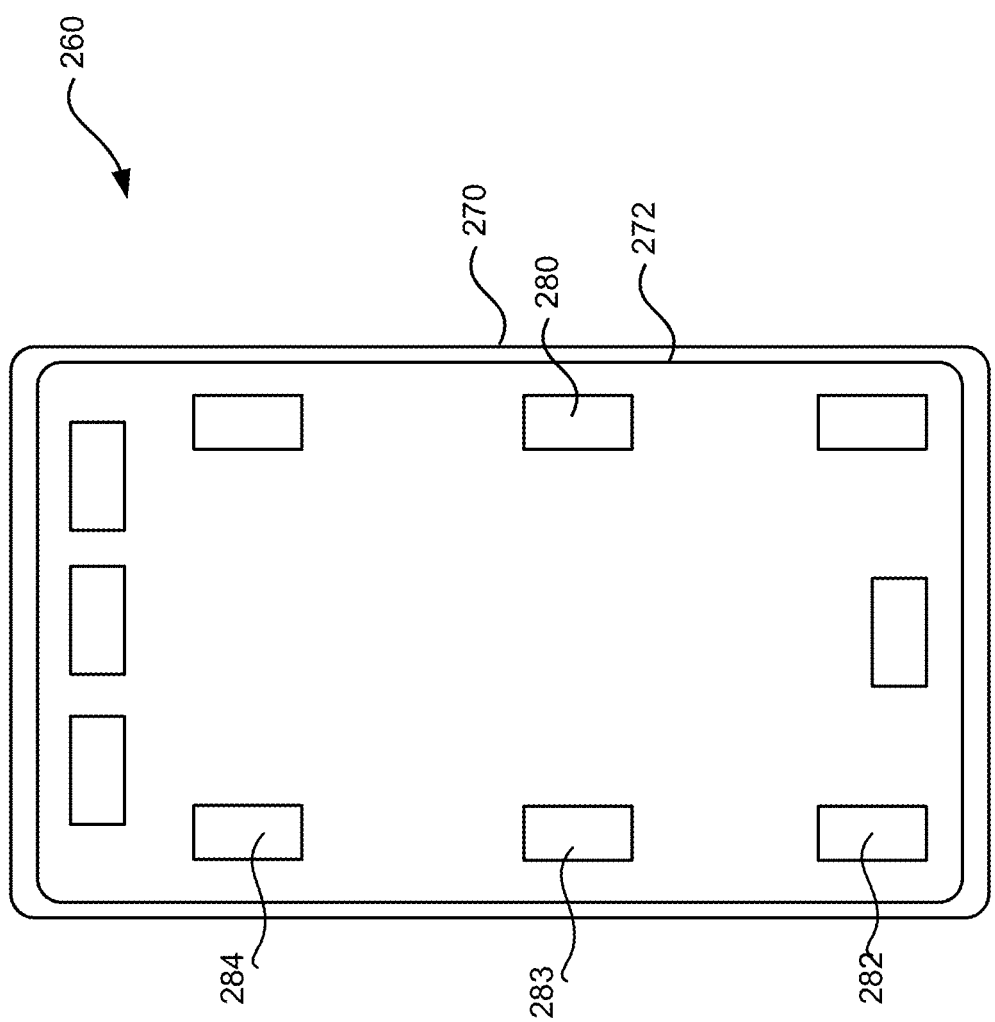

In order to detect gestures, the device 100 may be provided with one or more sensors. FIGS. 2A-C illustrate sensor arrangements for the device 100 as well as some other example devices. Referring to FIG. 2A, a portion of device 100 is shown. As shown, bezel 210 is shown to have a rounded shape. For instance, bezel 210 may be positioned as part of or inside the housing 110 shown in FIGS. 1A-1I. Bezel 210 may be made of any of a number of materials, such as metals, plastics, ceramics, wood, etc. In some instances, bezel 210 may be made of non-permeable material (e.g. water-proof) so that components inside the housing 110 and/or bezel 210 may be protected from environmental damage.

Inside the bezel 210, a sensor module 220 is shown. For instance, the sensor module 220 may be positioned on an inner periphery of the bezel 210. For example, the sensor module 220 may be attached to the inner periphery of the bezel 210. Further as shown, the sensor module 220 has a shape that conforms to the rounded surface of the bezel 210.

In some instances such as shown in the example of FIG. 2A, the sensor module 220 may include a plurality of sensors. With the plurality of sensors, device 100 may be able to detect gesture of a user at different locations of the device 100. Further as discussed below, device 100 may be configured to distinguish variations in the gesture (e.g., location, direction, velocity) based on sensor data from the plurality of sensors located at different locations. In some examples, the plurality of sensors may include at least six sensors, such as sensors 221-226 shown. The plurality of sensors 221-226 may be positioned in an arrangement around the bezel 210 that conforms to the shape of the bezel 210. For example, the plurality of sensors 221-226 may be evenly spaced around the bezel 210.

FIGS. 2B and 2C show additional examples of sensor arrangements, in particular in other types of devices. For instance, FIG. 2B shows an example earbud 230 with a housing 240. A bezel 242 is positioned inside or as part of the housing 240. Sensor module 250 is positioned inside an inner periphery of the housing 240. For example, the sensor module may be attached on an inner periphery of the bezel 242. As shown, the sensor module 250 conforms to a shape of the bezel 242 and therefore a shape of the housing 240. Further as shown, the sensor module 250 is shown in this example to have four sensors.

For another instance, FIG. 2C shows an example mobile phone 260 with a housing 270. A bezel 272 is positioned inside or as part of the housing 270. Sensor module 280 is positioned inside an inner periphery of the housing 270. For example, the sensor module may be attached on an inner periphery of the bezel 272. As shown, the sensor module 20 conforms to a shape of the bezel 272 and therefore a shape of the housing 270. Further as shown, the sensor module 280 is shown in this example to have 10 sensors. In this example, one or more sensors are positioned along each edge of the housing 270, in other examples, one or more edges of the housing 270 may not have sensors positioned along an inner surface thereof. It may be noted that the shape of the housing 270 and bezel 272 in this example has an inner surface that is mostly straight, with only rounded corners. As such, in order to conform to the shape of the bezel 272 and housing 270, the sensor module 280 may not need to be rounded.

Although FIGS. 2A-C illustrate various example sensor arrangements with inside a bezel inside of as part of a housing of an electronic device. Alternatively the sensor arrangements may be positioned directly inside a housing, such as directly attached to an inner periphery of the housing.

Figure 2D:
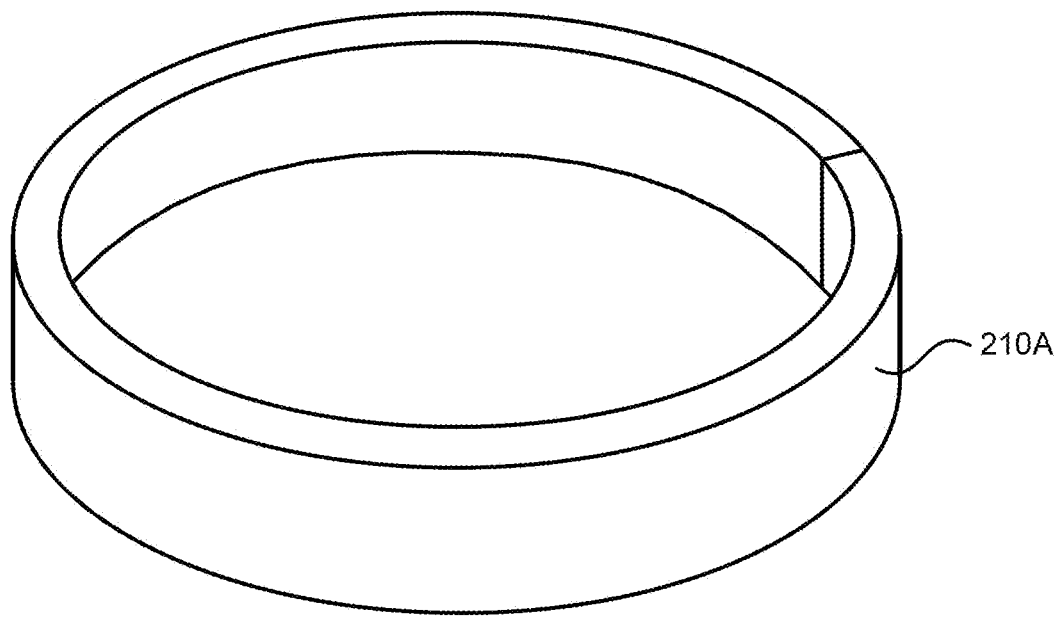
FIGS. 2D-E are perspective view of example housings in accordance with aspects of the disclosure.
Figure 2E:
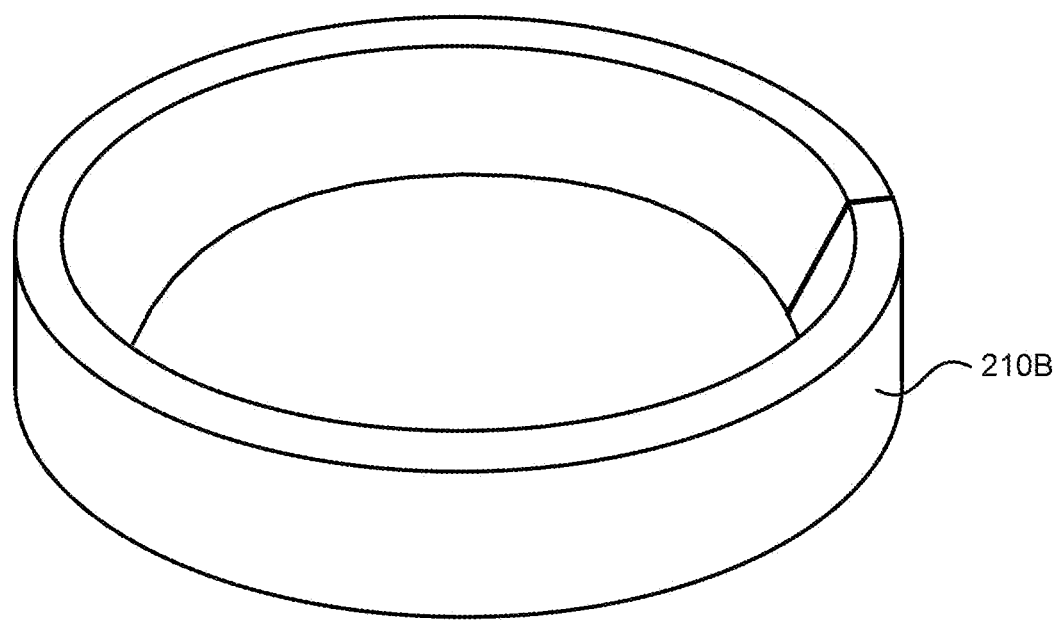

FIGS. 2D-E illustrate example bezel shapes that can be used for device 100. As one example, bezel 210A may have an inner surface that is rounded along a periphery of the device 100, but the inner surface may be perpendicular with respect to a surface of the device 100, such as a display surface. As another example, bezel 210B may similarly have an inner surface that is rounded around a periphery of the device 100, but the inner surface may be at a non-perpendicular angle with respect to a surface of the device 100, such as the display surface. Although the rounded shape of the bezel 210 in FIGS. 2D-E is shown as circular, other rounded shapes, such as oval or ellipse may be used. As such, the shape of the bezel may be configured to suit any of a number of needs, such as aesthetic needs, space constraints, mechanical support/protection needs, components that needed to be positioned inside the bezel, etc.

The sensors used in device 100 may be any of a number of types of sensors, such as capacitive sensors, magnetic sensors, visual sensors, etc. In some instances, the plurality of sensors may be strain gauge sensors. A strain gauge sensor measures strain on an object, or in other words, deformation of an object. For instance, without any force being applied to an object, the object may have a reference dimension. When a force is applied onto the object, a dimension of the object may change as a result of the force. For example, as a result of a compressive force (e.g., push), the dimension of the object may decrease, and as a result of a tensile force (e.g., pull), the dimension of the object may increase.

According to some examples, the sensors may include strain gauges. A conductive element inside the strain gauge stretches or compresses in sync with the surface to which it is mounted, and thereby detects a force applied to the surface. For example, when an electrical conductor is stretched within limits of its elasticity (before breaking or permanently deforming), the electrical conductor may become narrower and longer, which increases its electrical resistance along the direction of elongation. Conversely, when the electrical conductor is compressed within limits of its elasticity (before buckling), the electrical conductor may broaden and shorten, which decreases its electrical resistance along the direction of compression. As such, based on the measured electrical conductance, the strain gauge may determine an amount of induced stress (force/surface area) on the electrical conductor. Based on the amount of induced stress, and based on a surface area of the electrical conductor, a force applied onto the electrical conductor may be determined.

Thus, where strain gauge sensors are attached to the bezel 210 and/or housing 110, the electrical resistance of the sensors can be measured. Based on the electrical resistance of the strain gauge sensors, induced stress on the bezel 210 and/or housing 110 may be determined. Based on the induced stress, an applied force and or the location, velocity, or other parameters of the applied force on the bezel 210 and/or housing 110 may be determined. Based on the applied force on the bezel 210 and/or housing 110, a gesture of the user may be determined.

Figure 3:
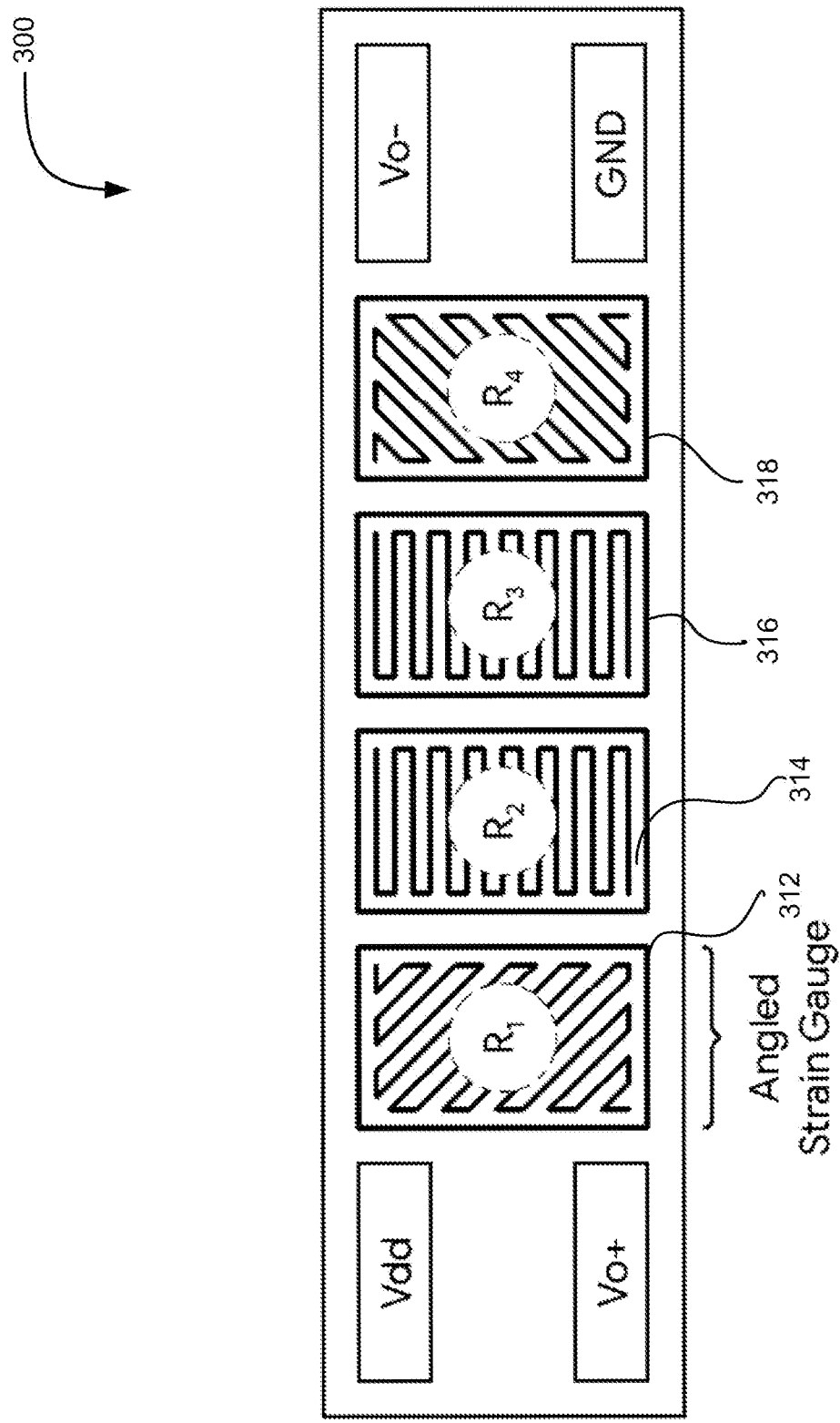
FIG. 3 is a block diagram illustrating an example sensor using strain gauges in accordance with aspects of the disclosure.

FIG. 3 illustrates an example strain gauge sensor including a plurality of strain elements 312, 314, 316, 318. Sensor 300 may be any of the plurality of sensors 221-226 shown in FIG. 2A. While the sensor 300 is shown as including 4 strained elements 312-318, it should be understood that in other examples the sensor 300 may include any number of strain elements. As shown, the strain elements 312-318 are arranged in a Wheatstone bridge configuration. According to some examples, this configuration may provide for enhanced signal detection. In other examples, any of a variety of other configurations of strained elements may be used. For example, some of the strain elements may be arranged in a Wheatstone bridge, however at perpendicular or non-perpendicular angles with respect to one another. The sensor 300 may be configured such that the strain elements 312-318 are positioned along an inner periphery of a bezel and/or housing of device 100.

Measurements using the arrangement of strain elements may be used to determine additional positional and/or directional information of an applied force. For instance, an applied force in a lateral direction may be simultaneously measured by strain elements 312-318.

According to some other examples, the strain elements 312-318 may independently measure applied force, wherein such measurements may be combined to determine direction, velocity, or the like. For example, because the detection surface of strain element 312, strain element 318, and strain elements 314 and 316 have different angles with respect to the applied force, and further because the four strain elements are positioned at slightly different positions, a direction of the force may be determined based on the variations in the measurements by the four strain elements. For example, if an applied force presses vertically down on sensor 300, strain elements 314 and 316 may measure greater strains than strain elements 312 and 318. If an applied force moves in a lateral direction, strain element 318 may measure greater strain than strain element 312, while strain element 314 may measure a strain earlier than strain element 316.

Based on the directionality of the applied force, device 100 may distinguish various gestures of the user. For instance, a squeeze may be indicated by strain applied in two substantially opposite directions, and movement of fingers around the device 100 in a swiping direction may be indicated by strain in changing directions.

Referring back to FIG. 2A, in some instances each of the sensors 221-226 may include strain gauges. In other instances, the sensors 221-226 may include different types of sensors. For instance, sensors 221-225 may include strain gauges, while sensor 226 may be a capacitive sensor. For example, a location on the housing 110 near sensor 226 may be a designed "button" such that only touch gestures that are presses are detected.

Figure 4:
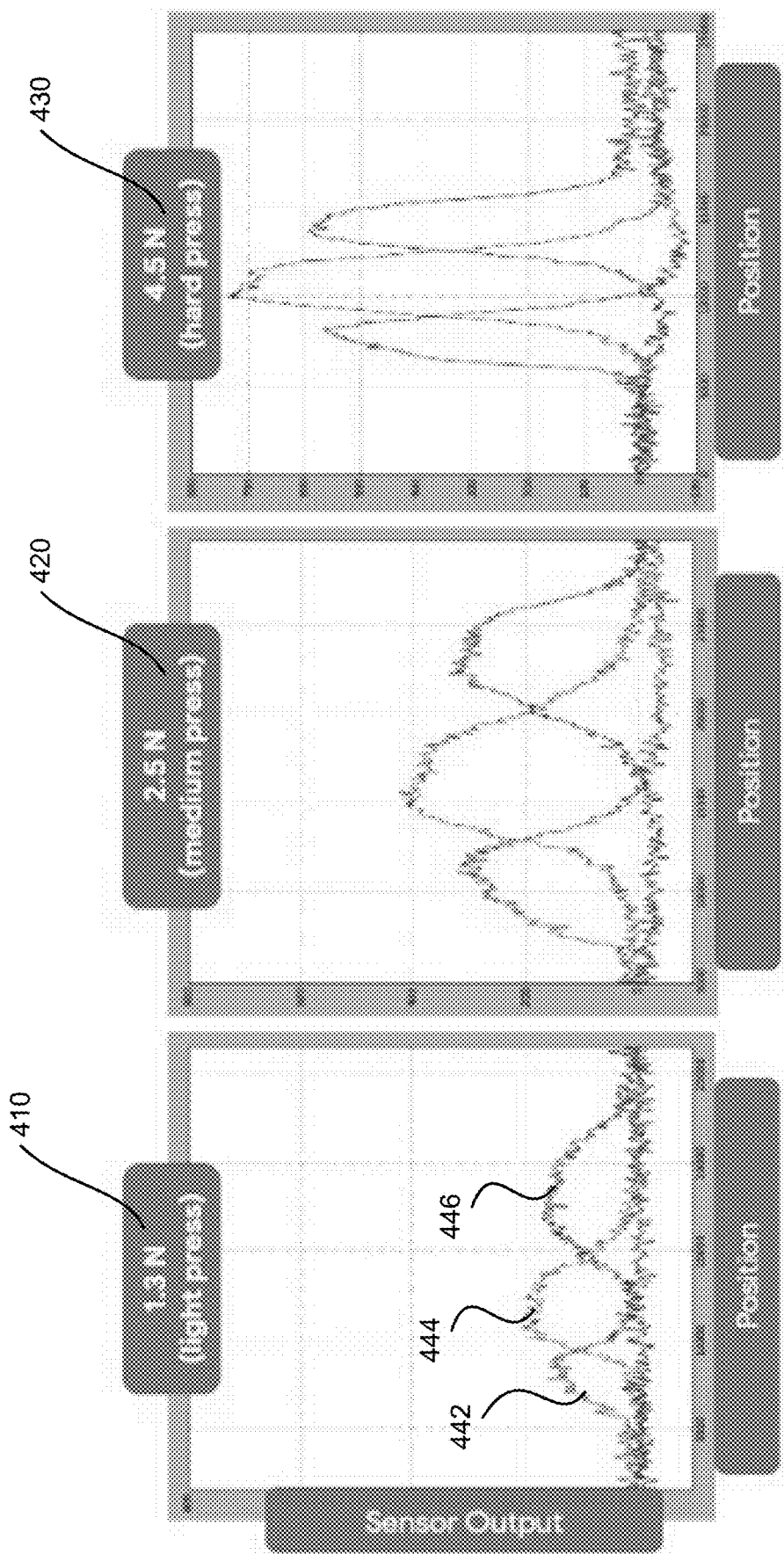
FIG. 4 show example graphs of sensor data indicating sensor response vs. position of input in accordance with aspects of the disclosure.

FIG. 4 shows example sensor data from example sensors of a device 500 (FIG. 5), when there are three sensors on one side of the device. For example, the sensor data may be measured by sensors, such as strain gauges, located at different positions along an inner periphery of the bezel and/or housing, such as from sensors 510. For instance, plot 410 shows sensor response vs. position along the edge of a phone for a relatively light touch moving around the edge. Each curve 442, 444, 446 may indicate sensor data measured by a particular one of the three sensors on the side of the device 500.

Plot 420 shows sensor data measuring a medium touch applied onto the bezel and/or housing of the device 500 detected by sensors 510 respectively. Plot 430 shows sensor data measuring a relatively hard touch applied along the bezel and/or housing of the device detected by the sensors.

In this regard, whether a press is characterized as light, medium, or hard may be based on one or more thresholds. For example, as shown, a force between 1.3 N and 2.5 N may be characterized as a light press, a force between 2.5 N and 4.5 N may be characterized as a medium press, and a force above 4.5 N may be characterized as a hard press. Additional and/or alternative thresholds may be set. For instance, a minimal threshold may be applied to screen for signals that are not indicative of actual gestures. For example, local minima and maxima may only be considered if the difference with neighboring minima/maxima is greater than the minimal threshold, thus filtering out points created by unintended movement and noise, and maintaining those representing significant shape changes caused by intended gestures. For example as shown, forces below 1.3 N may be screened as below the minimal threshold.

Further, features may be dependent on other feature thresholds. For example, local minima/maxima may only be considered if there is a spike in the variance of the signal. A spike in variance is indicative of an intentional user gesture, and therefore may be selected to create a window around which the algorithm will attempt to extract features and detect a gesture. These features inform a gesture detection algorithm that identifies a complete, intentional gesture from a user. The detection algorithm may involve heuristic components, such as thresholds on the feature values or pattern matching metrics, and machine learning components that have been trained on feature samples from both intentional gestures and accidental noise. For example, the features may be reduced using a Linear Discriminant Analysis (LDA) or Quadratic Discriminant Analysis (QDA) to find the boundaries between different gesture classes.

As such, one or more processors of device 500 may receive the sensor data such as those shown in FIG. 4, and determine whether a gesture involving a light, medium, or hard press is detected, or if a press is detected at all. Based on the gesture determination, processors of device 100 may determine a user command that corresponds to the gesture. Processors of device 100 may then control the device 100 to operate based on the user command.

Figure 5:
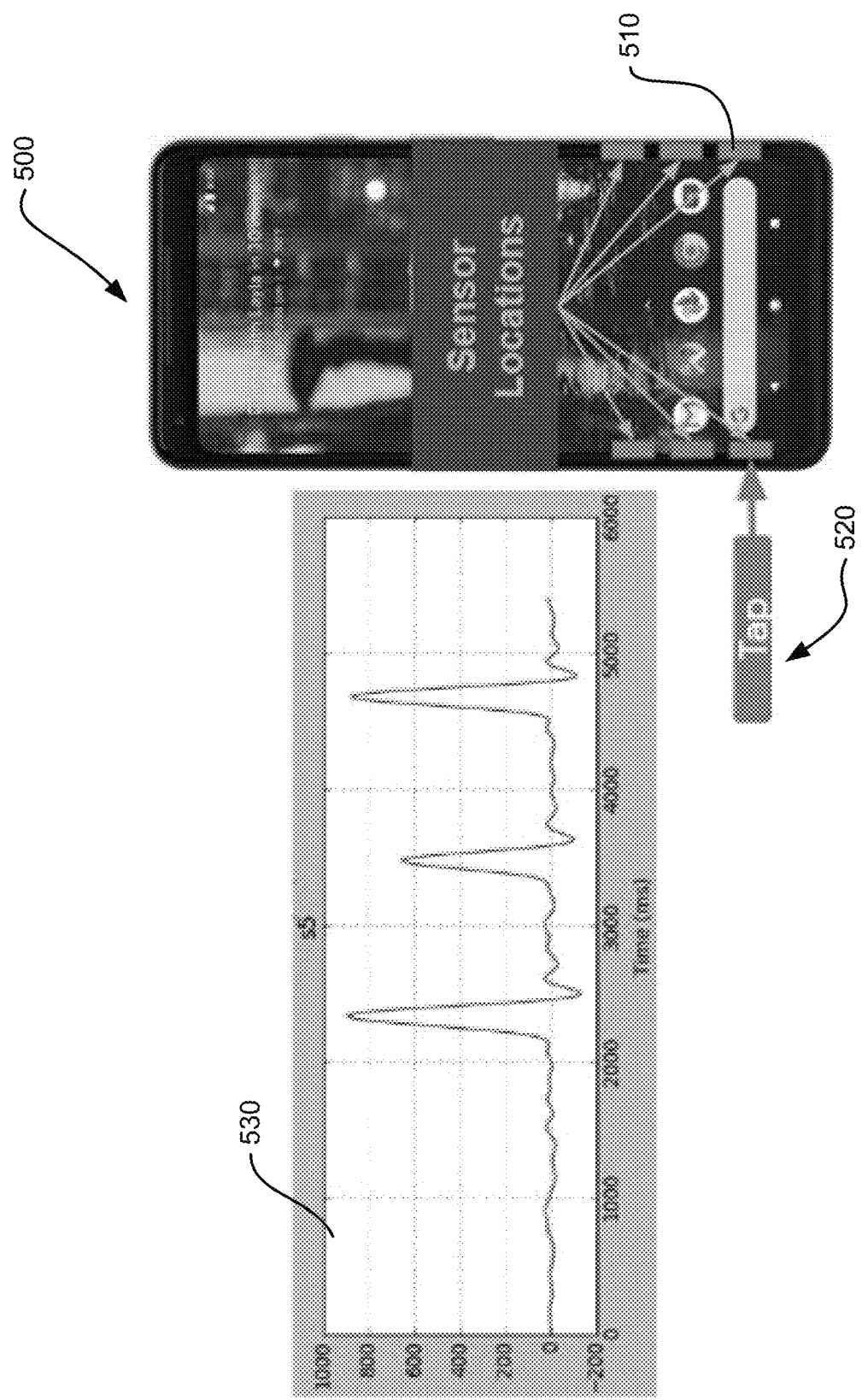
FIG. 5 show example graphs of sensor data indicating tap gestures in accordance with aspects of the disclosure.

FIG. 5 shows example sensor data from example device 500, which is shown to have a plurality of sensors 510. The sensors may include strain gauges. For example, sensor s5 of the plurality of sensors 510 may measure forces applied by one or more taps 520. As shown in plot 530, sensor s5 detects three peaks in measurements of applied force within a period of 3 s.

One or more processors of the device may receive the sensor data such as that shown in FIG. 5, and determine whether a gesture involving multiple taps is detected. In this regard, one or more thresholds may be set for determining whether the sensor data indicates a detection of a press or a tap. For example, a duration threshold, such as 500 ms, may be set such that, forces applied for a time longer than the duration may be characterized as a press, while forces applied for a time shorter than the duration may be cd whether the sensor data indicates a detection of three gestures, each is one tap, or a detection of one gesture comprising of three taps. For instance, a maximum time threshold may be set, for example 3 s, such that taps detected within the maximum time threshold may be characterized as a detection of one gesture.

Further, in some instances one or more processors of device 100 may further determine a number of taps detected for the gesture. Based on the gesture determination, processors of device 100 may determine a user command that corresponds to the gesture. Processors of device 100 may then control the device 100 to operate based on the user command.

Figure 6:
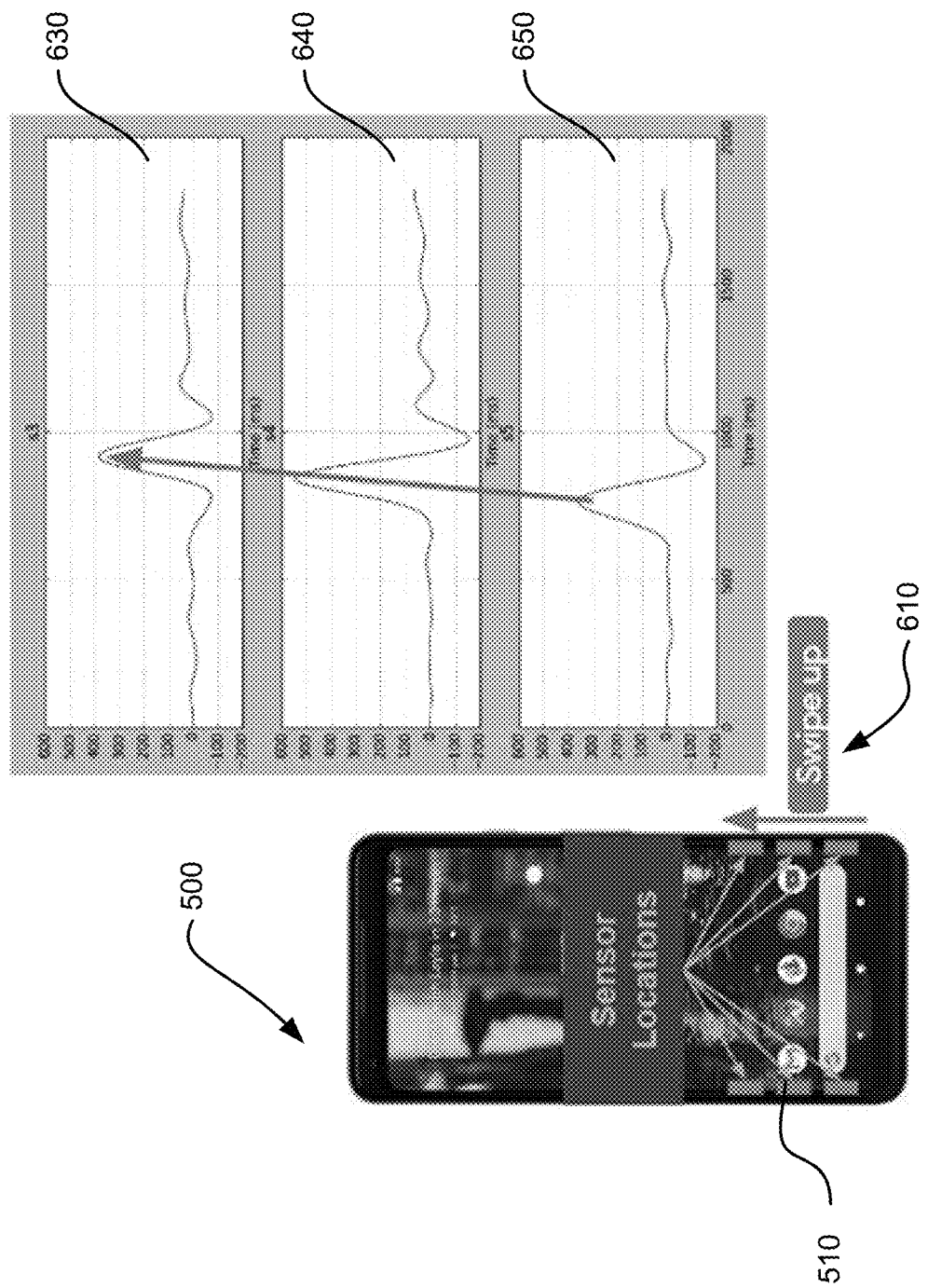
FIG. 6 show example graphs of sensor data indicating swipe gestures in accordance with aspects of the disclosure.

FIG. 6 shows another example of sensor data from example sensors of device 500, which is shown to have a plurality of sensors 510. For instance, the sensor may include strain gauges. For example, sensors s3, s4, s5 of the plurality of sensors 510 may measure forces applied by a swipe up 610 gesture. For instance, as shown, plot 630 shows measurement of strain by sensor s3, plot 640 shows measurement of strain by sensor s4, and plot 650 shows measurement of strain by sensor s5. As shown, a peak is detected by each of sensors s3, s4, s5, but at different times. Further, the order in which a peak is detected by the sensors s3, s4, s5 indicates force directionality. For example as shown, since sensor s5 detected the peak first, followed by sensor s4 (which is positioned above sensor s5 on device 500), followed by sensor s3 (which is positioned above sensor s4 on device 500), this indicates an upwards direction.

One or more processors of device 100 may receive the sensor data such as those shown in FIG. 6, and determine whether a gesture involving a swipe is detected. In this regard, one or more thresholds may be set for determining whether the sensor data indicates a detection of one swipe gesture, such as swipe 610, or a detection of three gestures each involving a separate tap near sensors s5, s4, s3 respectively. For instance, a maximum time threshold may be set, for example 1 s, such that applied force detected within the maximum time threshold may be characterized as a detection of one swiping gesture. Further in this regard, processors of device 100 may further determine whether the gesture is a swipe by determining whether the detection of the applied force is moving in one direction, as opposed to moving back and forth.

As illustrated by the examples shown in FIGS. 4-6, since the sensor data may be received over a time period, various properties based on time may be determined (already discussed above include duration). For example, velocity of the swipe 610 may be determined, which may indicate different gestures corresponding to different user commands. For another example, acceleration of the swipe 610 may additionally or alternatively be determined, which may further indicate different gestures corresponding to different user commands. Other examples of properties may include a moving variance of the velocity, a proportional change of the moving variance, etc.

FIG. 6 further illustrates that, using sensor data from only one sensor, it may not be possible or practicable to determine directions of gestures. As illustrated, only when sensor data from sensors s3, s4, s5 are analyzed in a whole a direction of the swipe 610 is determined. As such, device 100 may be further configured to combine the data from at least two of the plurality of sensors into a combined stream of sensor data. For example, the combined stream of sensor data may be a time series in a format of [t1; x1, x2, x3, x4, x5, x6], . . . , [tn; x1, x2, x3, x4, x5, x6], where t1, . . . , tn may be timestamps provided by the device for the measurement, x1 may indicate a strain measured by sensor 221, x2 may indicate a strain measured by sensor 222, x3 may indicate a strain measured by sensor 223, x4 may indicate a strain measured by sensor 224, x5 may indicate a strain measured by sensor 225, x6 may indicate a strain measured by sensor 226.

Figure 7:
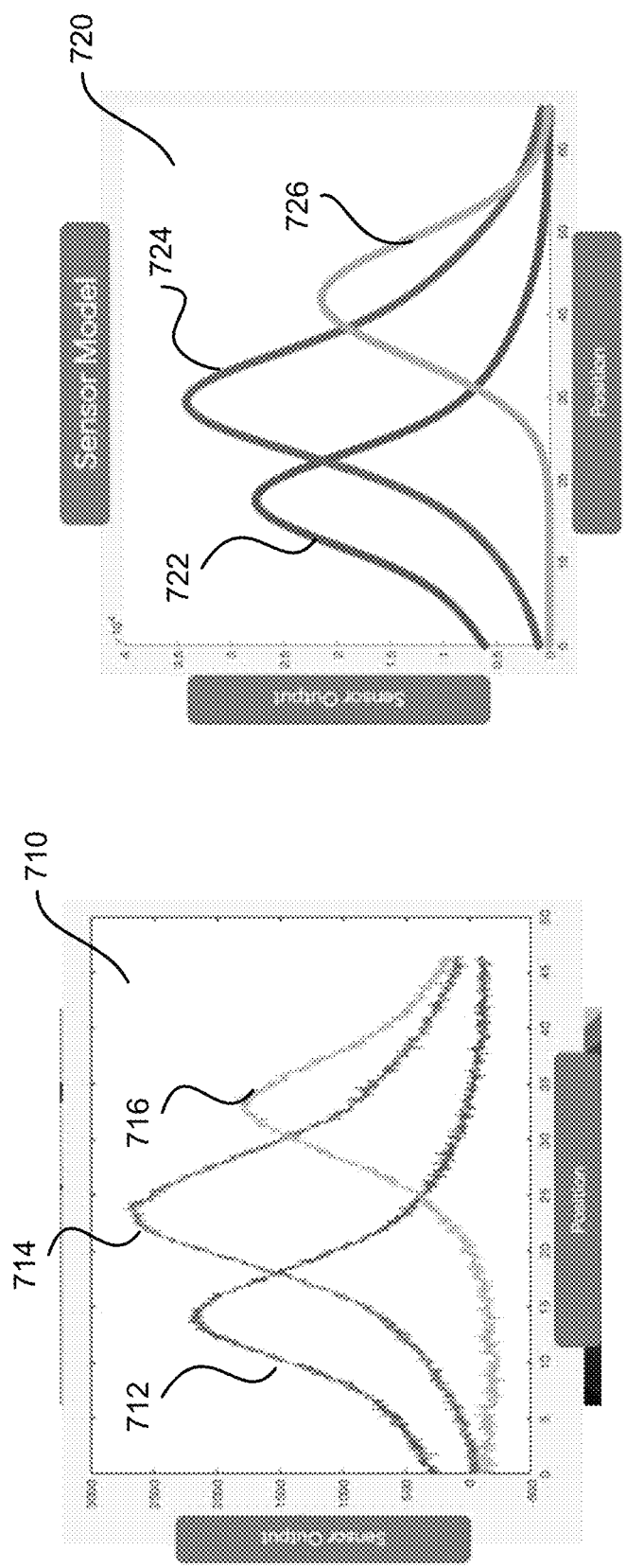
FIG. 7 show example graphs of models of sensor data in accordance with aspects of the disclosure.

In some instances, in order to facilitate determination of gestures based on sensor data, one or more models may be determined by and/or provided to the processors of device 100. For instance, FIG. 7 illustrates how models may be determined. For ease of illustration, only three models are shown, however, more or fewer models may be determined. As shown, raw data 710 may be collected from various sensors, such as sensors 221-223 of device 100. For example, plot 712 may be raw data collected from sensor 221, plot 714 may be raw data collected from sensor 222, and plot 716 may be raw data collected from sensor 223. Based on the raw data 710, models 720 may be determined. For example, model 722 may be determined for sensor 221, model 724 may be determined for sensor 222, and model 726 may be determined for sensor 223. In this regard, the models may be determined using any of a number of methods. For example, the models may be determined by performing regression on the raw data. For example, the models may be mathematical models, such as linear, exponential, power, Gaussian, second order Gaussian, logarithmic, etc.

Using the one or more models, processors of device 100 may determine a position and/or direction of movement. For example, FIGS. 8A-E illustrate one example of a method for determining an applied force and position, for a single point in time, of a gesture using the example models of FIG. 7. Directionality, and other features, can be determined by utilizing force and position estimates from multiple timesteps. These features can then be used to derive a gesture.

Figure 8B:
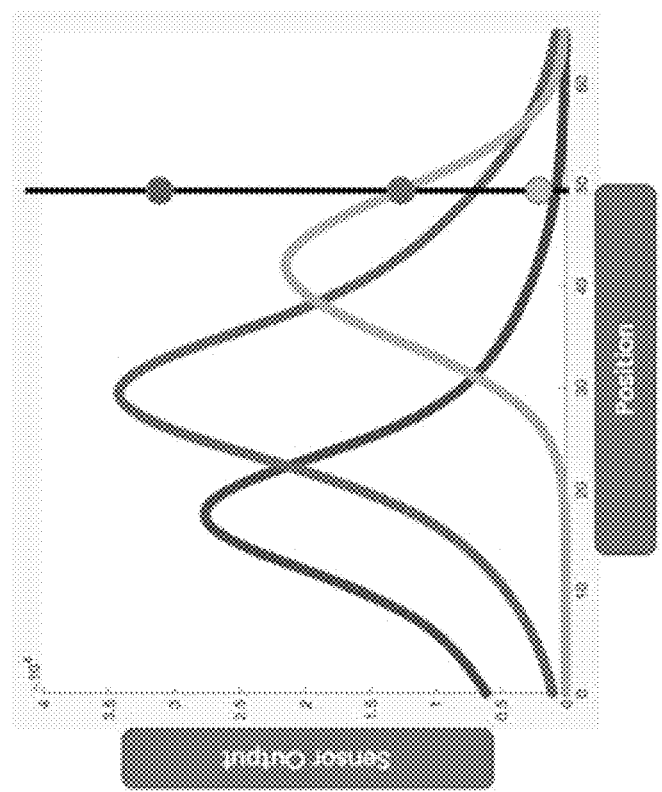
FIGS. 8A-8E illustrate an example of estimating position of gesture input in accordance with aspects of the disclosure.
Figure 8A:
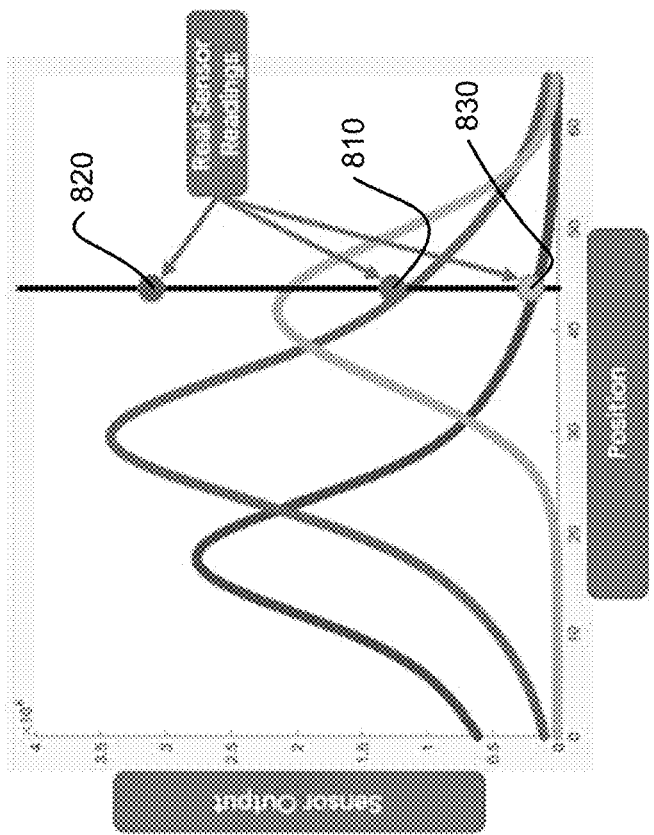
Figure 8D:
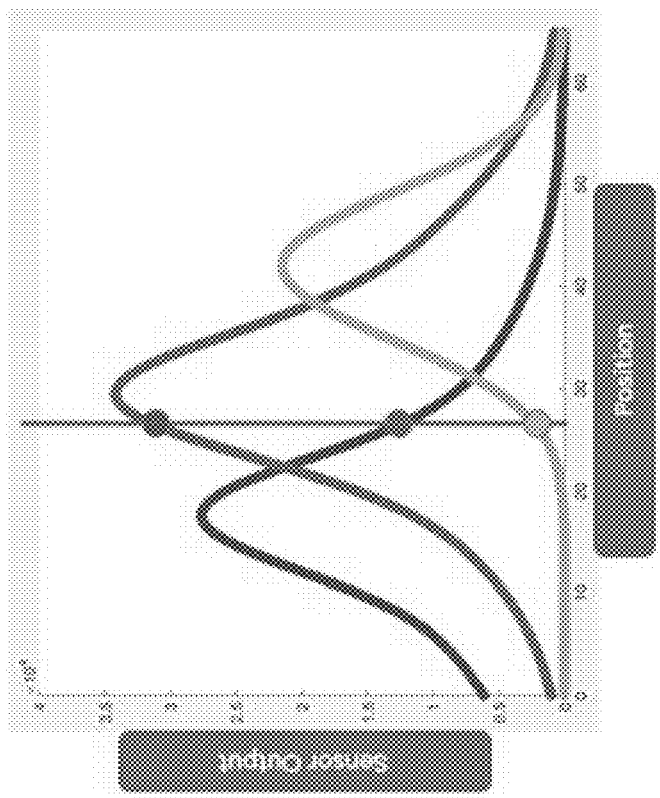
Figure 8C:
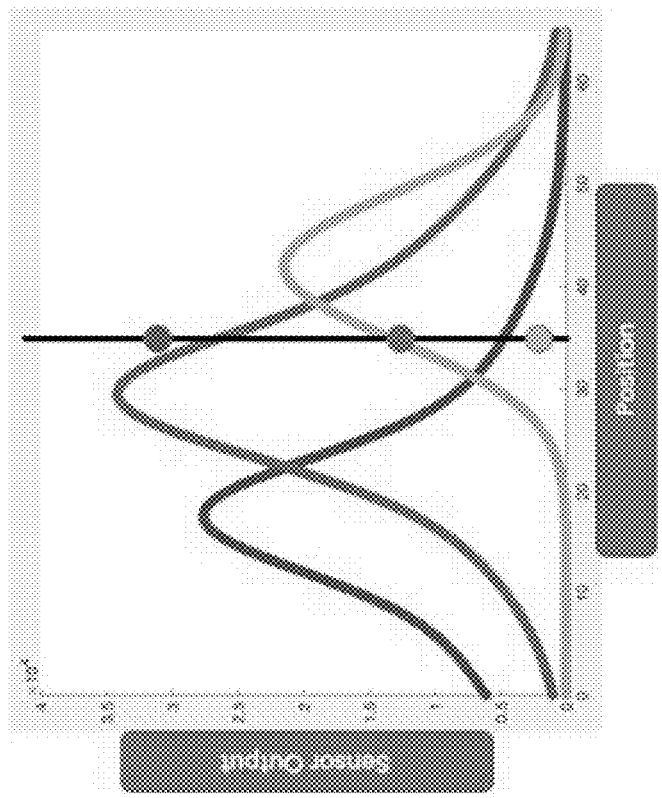
Figure 8E:
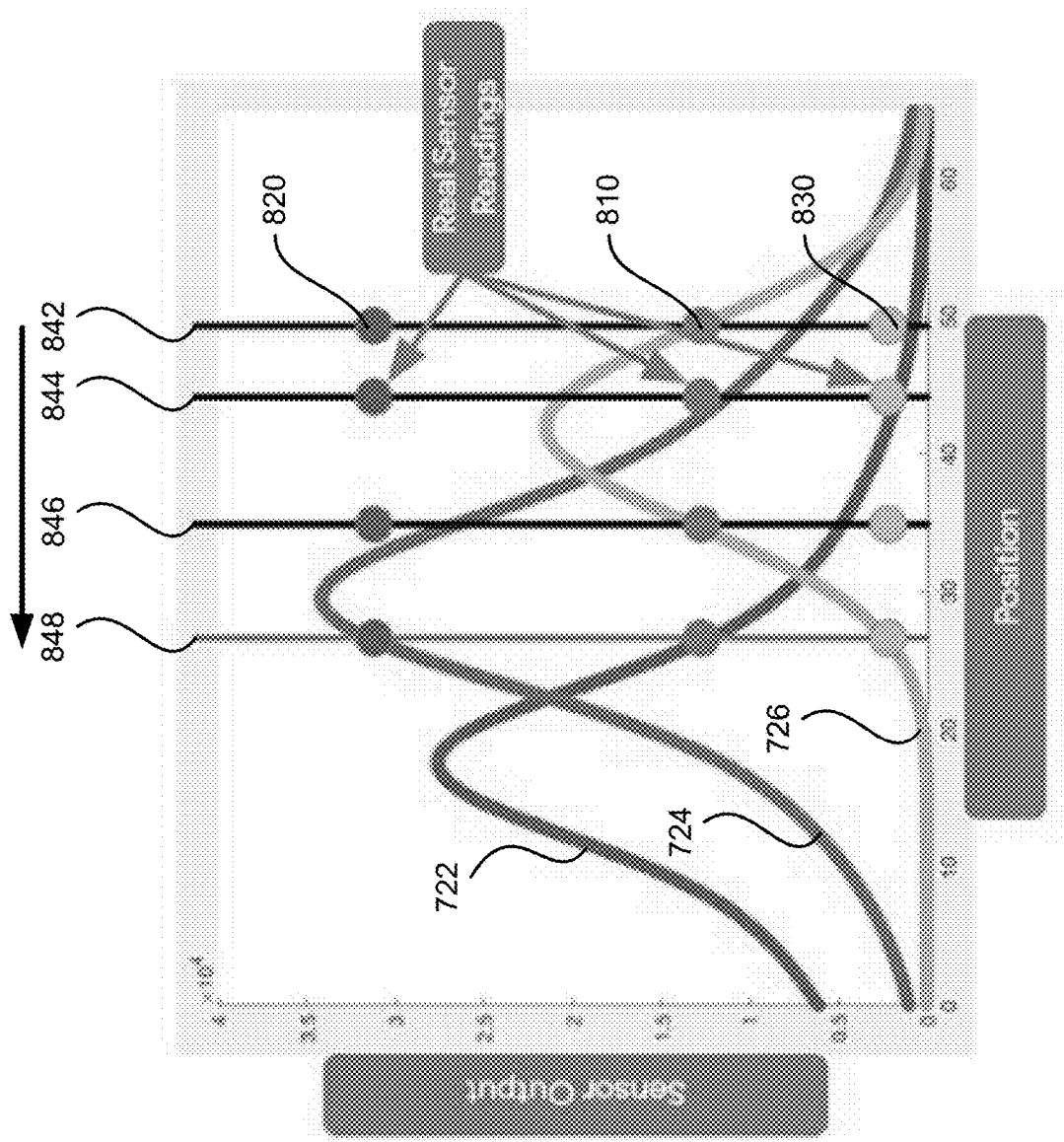

As shown, at a particular time point t1, the combined stream of sensor data may include three measurements [t1: x1, x2, x3]. The three measurements are shown in FIG. 8A as data point 810, data point 820, and data point 830. Processors of device 100 may make a first estimate 842 by aligning the data points 810, 820, 830 to the models 722, 724, 726. For example, as shown in FIGS. 8B-D, the processors attempt different alignments of the data points 810, 820, 830 until a position is achieved that fits the model. As shown in FIG. 8A, the first estimate fits poorly onto the models 722, 724, 726 for all three data points. Next, processors of device 100 may make a second estimate (FIG. 8B), and third estimate (FIG. 8C), by moving the data points to different positions of the models, which appear to be bad fits. As such, processors of device 100 may continue to make shift the data points 810, 820, 830 until a good fit is obtained for all the data points, such as the fourth estimate (FIG. 8D). As shown, the fourth estimate is the only estimate where data point 810 from sensor 221 fits in the model 722 for the sensor 221, data point 820 from sensor 222 fits in the model 724, and data point 830 from sensor 223 first in the model 726. FIG. 8E shows different estimates 842, 844, 846, and 848 corresponding to FIGS. 8A-8D, respectively.

Although FIG. 8E shows perfect fit for the fourth estimate 848, due to noises, inaccuracies in the models, and other errors, a perfect fit for all data points may not be possible. As such, an error threshold may be set such that, if all data points fits within the error threshold, processors of device 100 may determine that a fit has been reached.

While FIGS. 8A-E illustrate a non-linear least squares approach for determining applied force and position for a point in time, it should be understood that a variety of other approaches may be used. Examples of other approaches to extracting similar information include kalman filters, particle filters, various machine learning techniques, etc. Moreover, other methods may estimate not only position of the applied force, but also simultaneously estimate the force applied.

Figure 9:
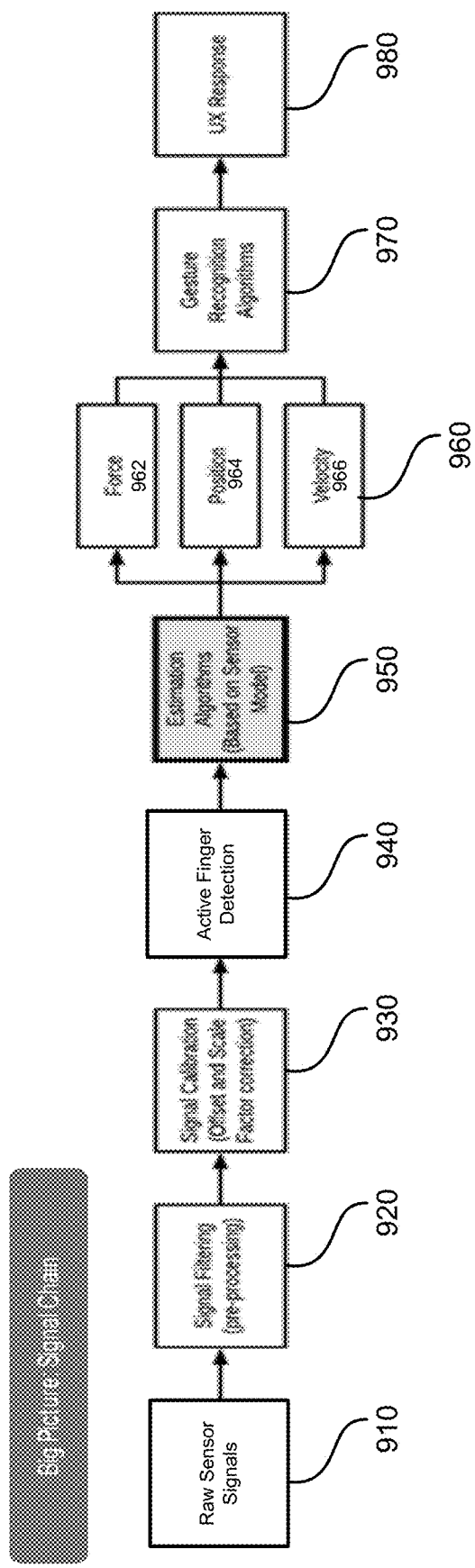
FIG. 9 is a block diagram illustrating example signal processing in accordance with aspects of the disclosure.

FIG. 9 is a block diagram showing an example signal processing chain. While a sequence of operations are shown, it should be understood that some operations may be performed in a different order or simultaneously. Moreover, it should be understood that operations may be added or omitted.

As shown, at block 910, raw data may be received from one or more sensors. In block 920, pre-processing may be performed on the raw data. For example, such processing may include filtering or other methods that remove noise from the raw data. In block 930, the pre-processed data may be calibrated. For example, the calibration may include normalization, correcting for offsets and scale factors of sensors, etc.

In some examples, the pre-processed and calibrated data may be optionally analyzed for active finger detection, such as shown in block 940. For example, processors of device 100 may determine that a certain level of force applied may simply be a multi-touch or a squeeze as a result of the user holding a mobile phone, and thus reject such force measurements as not active finger detection. In other instances, intentional squeeze or multi-touch with a stronger force, or squeeze or multi-touch applied to a device that is not typically handheld (such as a smartwatch), may not be rejected. While such active finger detection may reduce power consumption and falsing in some examples, it may be omitted in other examples.

In block 950, estimation algorithms may be used to determine position and/or direction of active finger detection. For example, the estimation may be those as shown in FIGS. 8A-D, which may be based on models such as those shown in FIG. 7. Based on the estimation, in block 960 processors of device 100 may determine various properties about the active finger detection. For example, the properties may include force 962, position 964, and/or velocity 966 of the active finger detection. According to some implementations, an estimator such as a Kalman Filter could enable simultaneous estimation of additional parameters, such as individual sensor biases, accelerations, etc. as they change over time. This could potentially reduce error in the system.

In block 970, a gesture may be determined based on any of a number of gesture recognition algorithms. For instance, the gesture recognition algorithms may be mathematical and/or heuristic rules based on the properties determined in block 960. According to further examples, the algorithms may be machine learning based. For example, the gesture recognition algorithms may be based on one or more thresholds described above. Based on the determined gesture, in block 980, processors of device 100 may determine a user command, or an appropriate response to the detected gesture.

Figure 10:
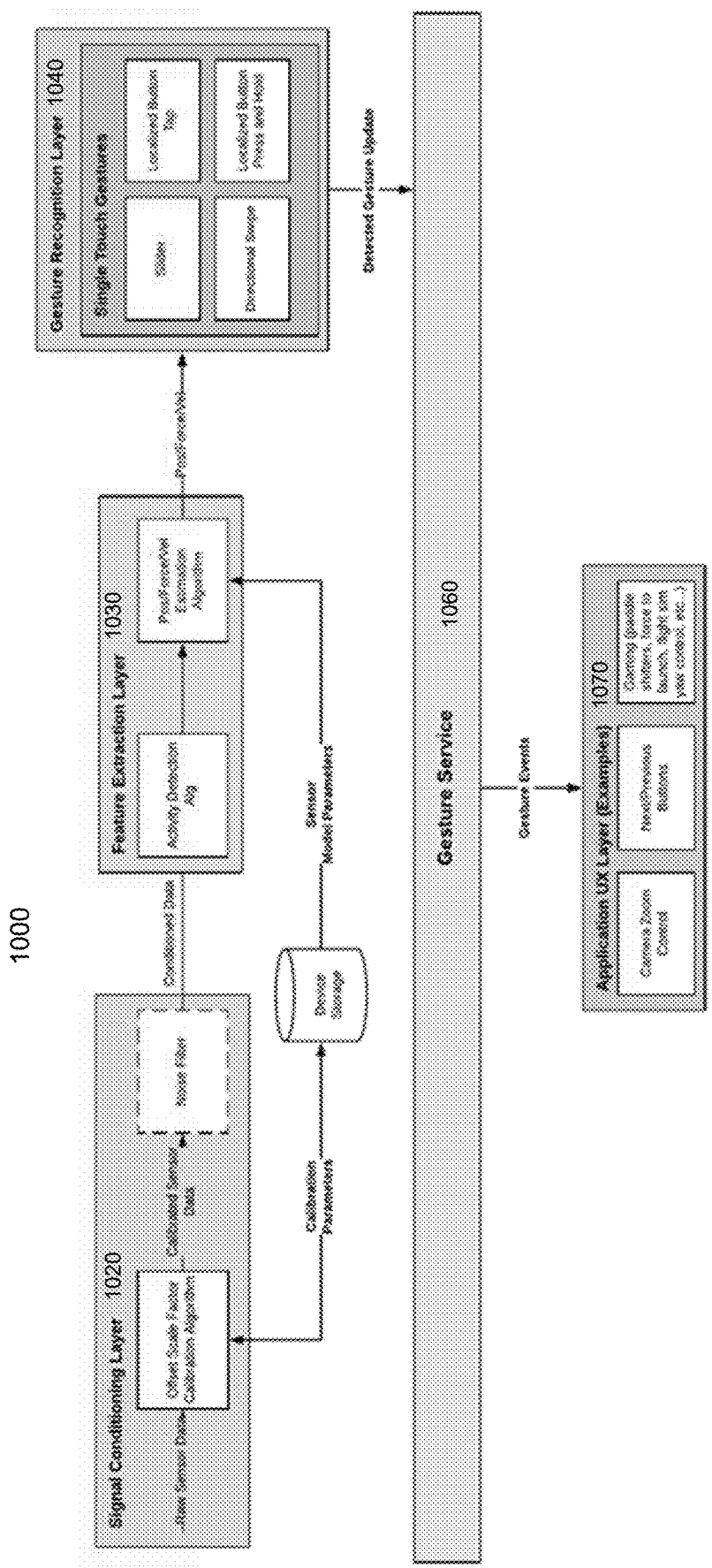
FIG. 10 is a block diagram illustrating example software architecture in accordance with aspects of the disclosure.

FIG. 10 is a block diagram showing example software architecture 1000 for detecting gestures. For example, the architecture 1000 may be used to perform the various functions shown in FIG. 9. A signal analysis application may include various layers, such as signal conditioning layer 1020, feature extraction layer 1030, and gesture recognition layer 1040. For instance, raw data may be received in the signal conditioning layer 1020, where pre-processing and calibration may be performed. Next, the pre-processed and calibrated data may be sent to the feature extraction layer 1030, which may analyze the data to determine various properties, such as position, force, velocity, etc. In some instances, the feature extraction layer 1030 may further determine properties indicative of multi-touch not resulting from active finger detection, such as by merely holding a phone, and reject such data as gesture detection.

Once properties of detected gestures are determined by the feature extraction layer 1030, the properties may be sent to the gesture recognition layer 1040, which may determine the types of gesture. For example, the gesture recognition layer may store thresholds, ranges, and other values indicative of different types of gestures, such as slide, swipe, localized button tap, localized button press and hold, etc. The recognized gesture may then be sent to an application layer 1070, which may include one or more processors. The recognized gesture may be sent, for example, via a gesture service 1060, such as an application programming interface (API). Based on the gesture, the application layer 1070 may then determine a user command corresponding to the gesture, and control one or more functions of the device 100 based on the user command Some example functions may include camera zoom, on/off button, gaming controls, any of the example functions described above, or other functions that the device 100 may be configured to perform.

In some instances, the raw data received from sensors may also be sent to a specialized application for detecting a particular type of gesture. For example, the raw data may be sent to application that specifically detects squeeze gestures. In such instances, the feature extraction layer 1030 may be configured ignore data indicative of gestures, such as squeeze, that may be detected by the specialized application.

Figure 11:
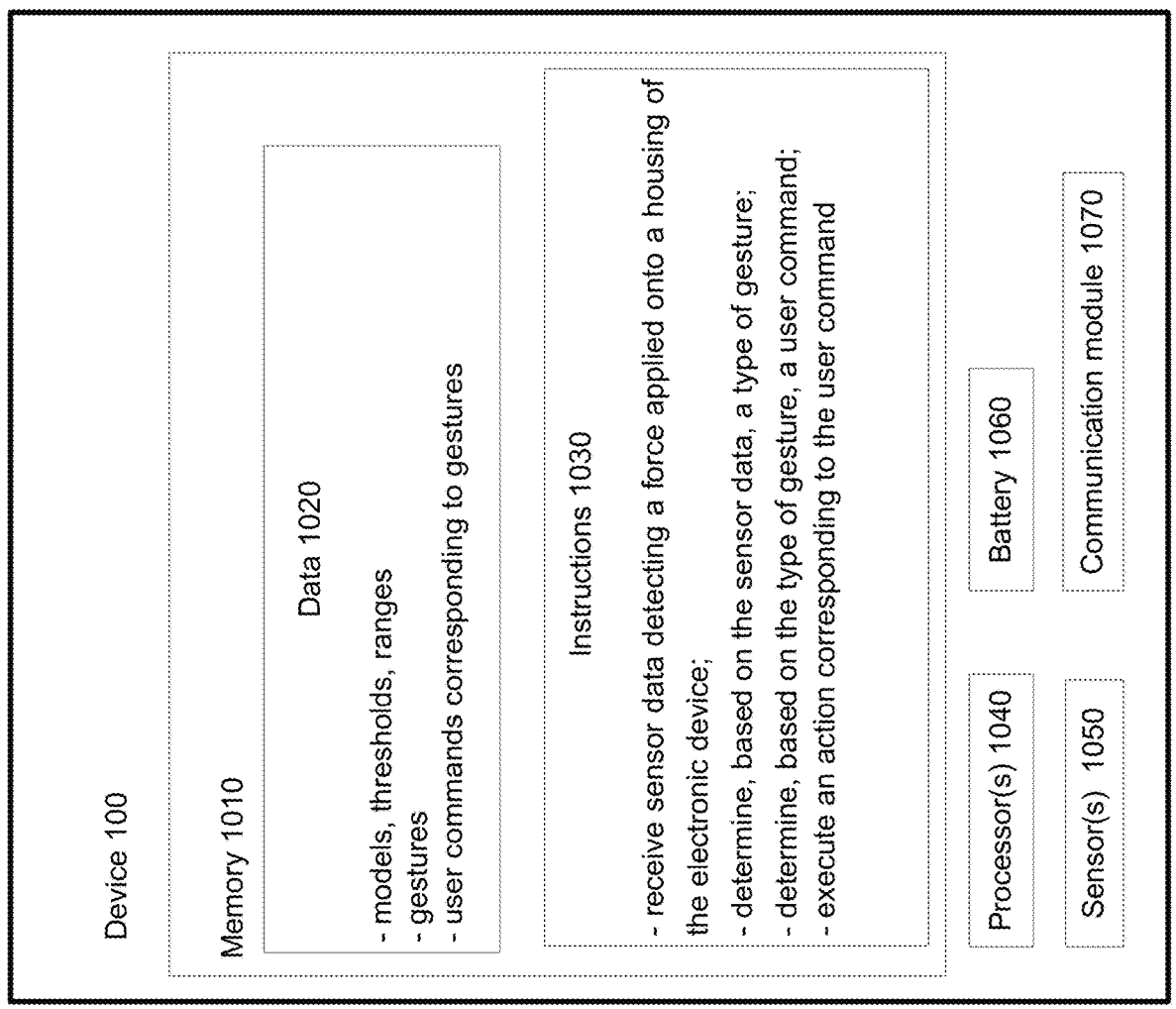
FIG. 11 is a block diagram illustrating example system in accordance with aspects of the disclosure.

FIG. 11 illustrates an example of internal components of a wearable computing device, such as device 100 shown as a smartwatch. While a number of internal components are shown, it should be understood that additional or fewer components may be included. By way of example only, the devices may include components typically found in wearable devices, such as speakers, microphones, displays, etc.

The device 100 may include one or more memory units 1010, processors 1040, as well as other components. For example, the device 100 may include one or more sensors 1050, battery 1060, and communication module 1070.

The memory 1010 may store information accessible by the one or more processors 1040, including data 1020, and instructions 1030 that may be executed or otherwise used by the one or more processors 1040. For example, memory 1010 may be of any type capable of storing information accessible by the processor(s), including a computing device-readable medium, or other medium that stores data that may be read with the aid of an electronic device, such as a volatile memory, non-volatile as well as other write-capable and read-only memories. By way of example only, memory may be a static random-access memory (SRAM) configured to provide fast lookups. Systems and methods may include different combinations of the foregoing, whereby different portions of the instructions and data are stored on different types of media.

The data 1020 may be retrieved, stored or modified by the one or more processors 1040 in accordance with the instructions 1030. For instance, data 1020 may include models, thresholds, ranges, and other values related to sensor data and/or gesture recognition. Data 1020 may include a list of gestures, for example may include properties of these gestures. Data 1020 may further include a correlation of user commands with particular gestures, a correlation of gestures with actions to be taken by the device 100, and/or any of a variety of other types of data. Although the claimed subject matter is not limited by any particular data structure, the data may be stored in computing device registers, in a relational database as a table having a plurality of different fields and records, XML documents or flat files. The data may also be formatted in any computing device-readable format.

The instructions 1030 may be any set of instructions to be executed directly (such as machine code) or indirectly (such as scripts) by the one or more processors 1040. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The instructions 615 may be executed to detect a gesture using signals from the sensors 618, determine an action corresponding to the detected gesture, and perform the action. Functions, methods and routines of the instructions are explained in more detail below.

The one or more processors 1040 may be microprocessors, logic circuitry (e.g., logic gates, flip-flops, etc.) hardwired into the device 100 itself, or may be a dedicated application specific integrated circuit (ASIC). It should be understood that the one or more processors 1040 are not limited to hard-wired logic circuitry, but may also include any commercially available processing unit, or any hardware-based processors, such as a field programmable gate array (FPGA). In some examples, the one or more processors 1040 may include a state machine. The processors 1040 may be configured to execute the instruction 615 to, for example, perform a method such as described below in connection with FIG. 7.

In some instances, the one or more processors 1040 may further include one or more low power processors (not shown) and one or more high power processors (not shown). In some instances, device 100 may be configured in a low power mode or ship mode. For example, device 100 may be configured in such a mode when initially packaged and shipped out to consumers. For another example, device 100 may be configured in such a mode when inactive for a predetermined period of time. In the low power mode, the device 100 may be configured to detect gestures using the low power processors, for example the low power processors may apply a filter such that only gestures with a force greater than a certain threshold is detected. Further, in the low power mode, the one or more processors 1040 may set a first sampling rate of the sensors 1050 at a low rate. For example, the threshold may be the hard press threshold shown in FIG. 4. Once the device 100 changes into an active mode from the low power mode, for example either by user turning the device 100 on or by detection of a hard press using the low power processors, the device 100 activates the high power processors, such that further detections of gestures are performed by the high power processors. Further, in the active mode, the one or more processors 1040 may set a second sampling rate of the sensors 1050 at rate that is higher than the first sampling rate. As such, the device 100 may be configured to conserve energy.

The one or more sensors 1050 may include any of a variety of mechanical or electromechanical sensors for detecting gestures. Such sensors may include strain sensors, such as strain gauge sensors. Such sensors may additionally or alternatively include, for example, capacitive sensors, an IMU, an optical sensor, such as a photoplethysmogram (PPG), etc. According to some examples, the sensors 1050 may further include an accelerometer, gyroscope, barometer, audio sensor, vibration sensor, heat sensor, radio frequency (RF) sensor, etc.

The communication module 1070 may be used to form connection links with other devices. For example, the communication module 1070 may include a short range wireless pairing interface used to form connections with other devices, such as a smartphone, earbuds, etc. The connection may be, for example, a Bluetooth connection or any other type of wireless pairing. By way of example only, connections with other devices may include an ACL link. For another example, the communication module 1070 may provide capabilities for other types of communication, such as over a network (internet, cellular, etc.), over wired connections, etc.

Although FIG. 11 functionally illustrates the processor, memory, and other elements of device 100 as being within the same block, it will be understood by those of ordinary skill in the art that the processor and memory may actually include multiple processors and memory units that may or may not be stored within the same physical housing. For example, memory 1010 may be a volatile memory or other type of memory located in a casing different from that of device 100. Moreover, the various components described above may be part of one or more electronic devices. By way of example only, the device 100 may detect signals and communicate information regarding the detected signals to a remote server, and receive corresponding information, such as which corresponding action to perform.

Figure 12:
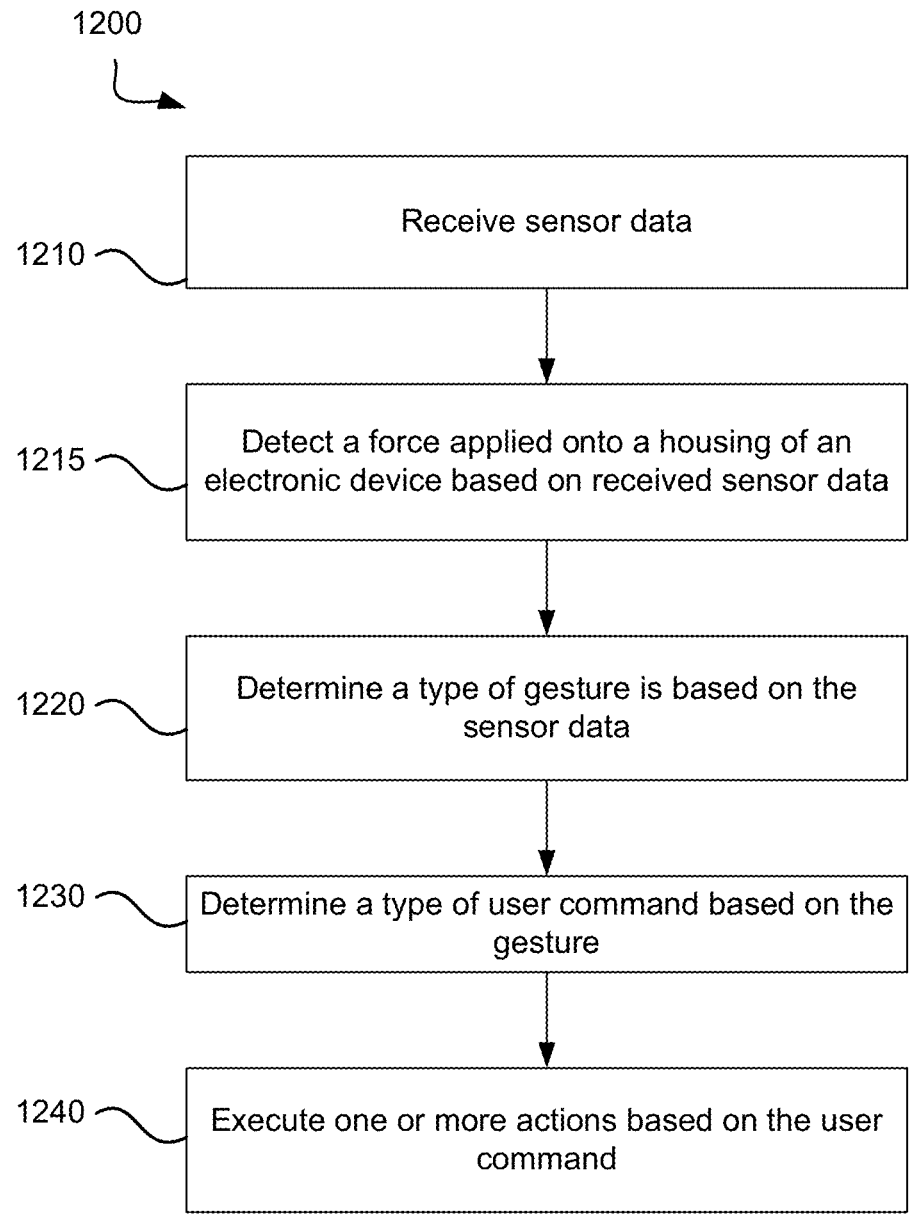
FIG. 12 is an example flow diagram in accordance with aspects of the disclosure.

FIG. 12 is a flow diagram illustrating an example method 1200 of detecting gestures by an electronic device. While the operations are illustrated and described in a particular order, it should be understood that the order may be modified and that operations may be added or omitted.

In block 1210, sensor data is received. For example, the sensor data may be received from one or more sensors along an edge of a housing of a device. The one or more sensors may include strain gauges. The sensor data may be raw sensor data. In block 1215, one or more processors may detect a force applied onto the housing of the electronic device based on the received sensor data.

In block 1220, a type of gesture is determined based on the sensor data. In block 1230, a type of user command is determined based on the gesture. In block 1240, one or more actions are executed based on the user command. In some examples, executing the action may simply include determining an operation to be performed. For example, the identified features may be matched with an operation, without first identifying the motion that caused such features.

The foregoing systems and methods are beneficial in that they enable precise input to electronic devices, in particular small form factor electronic devices. Sensors in the system may be configured to detect subtle differences in gestures, such as directions, positions, timing, velocity, force, etc. As such, user experience is improved because users will more easily be able to enter input, with fewer mistakes. Still further, sensor in the system may provide flexibility in product design, such as material choices that may provide better aesthetic, mechanical, and other properties.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An electronic device, comprising:
   a housing;
   two or more sensors positioned along an inner periphery of the housing, the two or more sensors being separate sensors; and
   one or more processors in communication with the two or more sensors, the one or more processors configured to:
   fuse information detected by at least two of the sensors into a combined stream of sensor data at a series of time points, the combined stream of sensor data including at least two data points at each time point;
   determine, using the fused information, a user interaction with an outer surface of the housing;
   determine a type of gesture based on the detected user interaction;
   correlate the fused sensor data with models for at least two sensors;
   estimate, based on the correlation, properties of the gesture including one or more positions where the applied force is detected;
   determine a type of input command based on the determined gesture; and
   execute a task corresponding to the determined type of input command.

2. The electronic device of claim 1, wherein at least one of the two or more sensors is a strain gauge sensor.

3. The electronic device of claim 1, wherein at least one of the two or more sensors comprise strain elements arranged in a Wheatstone bridge configuration.

4. The electronic device of claim 1, wherein the inner periphery of the housing is angled with respect to an outer periphery of the housing.

5. The electronic device of claim 1, wherein the housing is made of metal.

6. The electronic device of claim 1, wherein the electronic device is one of: a smart watch, an earbud, or a mobile phone.

7. The electronic device of claim 1, wherein the type of gesture includes one of a press, tap, squeeze, or swipe.

8. The electronic device of claim 1, further comprising:
   a metal bezel, wherein the one or more sensors are attached to the metal bezel.

9. A method of detecting input to an electronic device, comprising:
   receiving, by one or more processors from two or more sensors, sensor data related to an interaction with a housing of the electronic device, the two of more sensors being separate sensors;
   fusing, by the one or more processors, sensor data received from at least two of the sensors into a combined stream of sensor data at a series of time points, the combined stream of sensor data including at least two data points at each time point;
   determining, by the one or more processors based on the fused sensor data, a type of gesture;
   correlating, by the one or more processors, the fused sensor data with models for at least two sensors;
   estimating, by the one or more processors based on the correlation, properties of the gesture including one or more positions where the applied force is detected;
   determining, by the one or more processors based on the type of gesture, a type of user command; and
   executing, by the one or more processors based on the type of input command, an action corresponding to the user command.

10. The method of claim 9, further comprising:
    determining, by the one or more processors based on the sensor data, one or more positions on the housing where the force is applied, wherein determining the type of gesture is further based on the positions on the housing where the force is applied.

11. The method of claim 9, further comprising:
    determining, by the one or more processors based on the sensor data, a direction in which the force is applied, wherein determining the type of gesture is further based on the direction in which the force is applied.

12. The method of claim 9, further comprising:
    determining, by the one or more processors based on the sensor data, a velocity of the force applied, wherein determining the type of gesture is further based on the velocity of the force is applied.

13. The method of claim 9, further comprising:
    determining, by the one or more processors based on the sensor data, a duration of the force applied, wherein determining the type of gesture is further based on the duration of the force is applied.

14. The method of claim 9, further comprising:
    determining, by the one or more processors based on the sensor data, that the force is applied successively within a predetermined time period, wherein determining the type of gesture is further based on whether the force is applied successively within a predetermined time period.

15. The method of claim 9, further comprising:
    correlating, by the one or more processors, the fused sensor data with models for at least two sensors;

estimating, by the one or more processors based on the correlation, properties of the gesture including one or more positions where the applied force is detected.

16. The method of claim 9, wherein the properties further include a magnitude of the applied force detected at the one or more positions.

17. The method of claim 9, further comprising:
setting, by the one or more processors, a first sampling rate for the sensors;
applying, by the one or more processors, a filter on sensor data received from the sensors for detecting whether a force meeting a threshold value.

18. The method of claim 17, further comprising:
determining, by the one or more processors, that the filtered sensor data indicates a force meeting the threshold value;
determining, by the one or more processors based on the force meeting the threshold value, a detection of a gesture of a user;
setting, by the one or more processors, a second sampling rate for the sensors, the second sampling rate being higher than the first sampling rate.

19. A method of determining gesture input for an electronic device, comprising:
receiving, from two or more sensors, sensor data related to an interaction with a housing of the electronic device, the sensor data including a plurality of data points, the two or more sensors being separate sensors;
fusing, with the one or more processors, sensor data received from at least two of the sensors into a combined stream of sensor data at a series of time points, the combined stream of sensor data including at least two data points at each time point;
correlating, by the one or more processors, the fused sensor data with models for at least two sensors;
estimating, by the one or more processors based on the correlation, properties of the gesture including one or more positions where the applied force is detected;
comparing, with one or more processors, the plurality of data points to a model of sensor responses;
deriving, with the one or more processors based on the comparison, a parameter in which the data points align with the model; and
determining, with the one or more processors based on the derived parameter, a gesture.

20. The method of claim 19, wherein each data point corresponds to information from an independent sensor.

21. The method of claim 20, wherein the model of sensor responses includes a plurality of curves, each curve corresponding to one of the independent sensors.

22. The method of claim 19, wherein the parameter includes at least one of a position, a level of applied force, or a velocity.

* * * * *